(12) United States Patent
DuPriest et al.

(10) Patent No.: US 8,672,057 B2
(45) Date of Patent: Mar. 18, 2014

(54) METHOD FOR CONTROLLING LOSS OF DRILLING FLUID

(71) Applicants: Fred E. DuPriest, Kingwood, TX (US); Martin V. Smith, Friendswood, TX (US); Sabine C. Zeilinger, Spring, TX (US); Chinar R. Aphale, Houston, TX (US)

(72) Inventors: Fred E. DuPriest, Kingwood, TX (US); Martin V. Smith, Friendswood, TX (US); Sabine C. Zeilinger, Spring, TX (US); Chinar R. Aphale, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 21 days.

(21) Appl. No.: 13/758,809

(22) Filed: Feb. 4, 2013

(65) Prior Publication Data

US 2013/0146294 A1    Jun. 13, 2013

Related U.S. Application Data

(62) Division of application No. 12/663,470, filed as application No. PCT/US2008/007539 on Jun. 17, 2008, now Pat. No. 8,393,411.

(60) Provisional application No. 60/962,040, filed on Jul. 26, 2007, provisional application No. 61/003,640, filed on Nov. 19, 2007.

(51) Int. Cl.
   *C09K 8/03* (2006.01)
   *E21B 33/13* (2006.01)

(52) U.S. Cl.
   USPC .......................................... 175/65; 166/292

(58) Field of Classification Search
   USPC .............. 175/65, 67, 206, 207; 166/281, 292; 703/10
   See application file for complete search history.

(56) References Cited

U.S. PATENT DOCUMENTS

| | | | |
|---|---|---|---|
| 3,208,523 A | 9/1965 | Coyle et al. | |
| 3,219,111 A | 11/1965 | Armentrout | |
| 3,323,595 A | 6/1967 | Knox et al. | |
| 3,375,888 A | 4/1968 | Lummus et al. | |
| 3,455,390 A * | 7/1969 | Gallus | 166/295 |
| 3,496,902 A | 2/1970 | Cleary et al. | |

(Continued)

FOREIGN PATENT DOCUMENTS

| | | |
|---|---|---|
| EP | 1 527 255 | 9/2006 |
| WO | WO 94/09254 | 4/1994 |

(Continued)

OTHER PUBLICATIONS

Alberty, M.W. et al., "A Physical Model for Stress Cages", SPE 90493, Sep. 26-29, 2004, pp. 1-8, SPE Annual Technical Conf. & Exh., Houston, TX.

(Continued)

*Primary Examiner* — Daniel P Stephenson
(74) *Attorney, Agent, or Firm* — ExxonMobil Upstream Research Company—Law Department

(57) ABSTRACT

Methods for drilling and treating for lost returns continuously while drilling are provided. High fluid loss drilling fluid is used, along with particulate material that forms an immobile mass in hydraulic fractures to prevent their growth. The particulate material may be selected based on the predicted size of a hydraulic fracture, based on particle size to minimize fines, based on specific gravity to attain high solids content for a selected fluid density, and/or based on permeability of the particles to attain a high spurt loss.

10 Claims, 13 Drawing Sheets

(56) References Cited

U.S. PATENT DOCUMENTS

| | | | |
|---|---|---|---|
| 3,709,300 | A | 1/1973 | Pye |
| 4,109,721 | A | 8/1978 | Slusser |
| 4,289,632 | A | 9/1981 | Clear |
| 4,369,844 | A | 1/1983 | Clear |
| 5,065,820 | A | 11/1991 | Bloys et al. |
| 5,071,575 | A | 12/1991 | House et al. |
| 5,180,020 | A | 1/1993 | Fuh et al. |
| 5,207,282 | A | 5/1993 | Fuh et al. |
| 5,325,921 | A | 7/1994 | Johnson et al. |
| 5,504,062 | A | 4/1996 | Johnson |
| 5,861,362 | A | 1/1999 | Mayeux et al. |
| 5,944,105 | A | 8/1999 | Nguyen |
| 6,016,879 | A | 1/2000 | Burts, Jr. |
| 6,017,854 | A | 1/2000 | Van Slyke |
| 6,143,698 | A | 11/2000 | Murphey et al. |
| 6,179,069 | B1 | 1/2001 | Zheng |
| 6,374,925 | B1 | 4/2002 | Elkins et al. |
| 6,458,283 | B1 | 10/2002 | Adams et al. |
| 6,518,224 | B2 | 2/2003 | Wood |
| 6,562,764 | B1 | 5/2003 | Donaldson et al. |
| 6,605,570 | B2 | 8/2003 | Miller et al. |
| 6,739,414 | B2 | 5/2004 | Brookey et al. |
| 6,790,812 | B2 | 9/2004 | Halliday et al. |
| 6,815,399 | B1 | 11/2004 | Johnson et al. |
| 6,820,702 | B2 | 11/2004 | Niedermayr et al. |
| 6,823,950 | B2 | 11/2004 | von Eberstein, Jr. et al. |
| 6,837,309 | B2 | 1/2005 | Boney et al. |
| 6,837,313 | B2 | 1/2005 | Hosie et al. |
| 6,938,707 | B2 | 9/2005 | Schmidt et al. |
| 7,004,255 | B2 | 2/2006 | Boney |
| 7,033,977 | B2 | 4/2006 | Brookey et al. |
| 7,098,172 | B1 | 8/2006 | Horton et al. |
| 7,297,662 | B2 | 11/2007 | Verret |
| 7,297,663 | B1 | 11/2007 | Kilchrist et al. |
| 7,405,182 | B2 | 7/2008 | Verrett |
| 7,521,400 | B2 | 4/2009 | Samuel |
| 7,789,146 | B2 * | 9/2010 | Panga et al. .................. 166/278 |
| 2003/0181338 | A1 | 9/2003 | Sweatman et al. |
| 2003/0186819 | A1 | 10/2003 | Shaarpour |
| 2004/0211595 | A1 | 10/2004 | Pinckard et al. |
| 2004/0244978 | A1 | 12/2004 | Shaarpour |
| 2005/0087367 | A1 | 4/2005 | Hutchinson |
| 2005/0272613 | A1 | 12/2005 | Cooke, Jr. |
| 2005/0284667 | A1 | 12/2005 | Davidson |
| 2006/0094604 | A1 | 5/2006 | Fang et al. |
| 2006/0096759 | A1 | 5/2006 | Reddy et al. |
| 2006/0131074 | A1 | 6/2006 | Calhoun et al. |
| 2006/0157248 | A1 | 7/2006 | Hoefer et al. |
| 2006/0254826 | A1 | 11/2006 | Alberthy |
| 2006/0266107 | A1 | 11/2006 | Sweatman et al. |
| 2006/0266519 | A1 | 11/2006 | Sweatman et al. |
| 2006/0272860 | A1 | 12/2006 | Sweatman et al. |
| 2007/0012447 | A1 | 1/2007 | Fang et al. |
| 2007/0111899 | A1 | 5/2007 | Wood |
| 2007/0169937 | A1 | 7/2007 | Allin et al. |
| 2008/0194429 | A1 | 8/2008 | Jarrett |
| 2009/0029878 | A1 | 1/2009 | Bicerano |
| 2009/0176666 | A1 | 7/2009 | Miller |

FOREIGN PATENT DOCUMENTS

| | | |
|---|---|---|
| WO | WO 03/052023 | 6/2003 |
| WO | WO 2004/018841 | 3/2004 |
| WO | WO 2005/003513 | 1/2005 |
| WO | WO 2005/012687 | 2/2005 |
| WO | WO 2006/040578 | 4/2006 |
| WO | WO 2006/082416 | 8/2006 |
| WO | WO 2007/005499 | 1/2007 |
| WO | WO 2007/005822 | 1/2007 |

OTHER PUBLICATIONS

Aston, M.S., et al., "Drilling Fluids for Wellbore Strengthening", SPE 87130, Mar. 2-4, 2004, pp. 1-8, IADC/SPE Drilling Conf., Dallas, TX.

Bratton, T.R., et al., "How to Diagnose Drilling Induced Fractures in Wells Drilled with Oil-Based Muds with Real-Time Resistivity and Pressure Measurements", SPE 66742, Feb. 27-Mar. 1, 2001, pp. 1-10, SPE/IADC Drilling Conf., Amsterdam, The Netherlands.

Bruton, J. R., et al., "Lost Circulation Control: Evolving Techniques and Strategies to Reduce Downhole Mud Losses", SPE 67735, Feb. 27-Mar. 1, 2001, pp. 1-9, SPE/IADC Drilling Conf., Amsterdam, The Netherlands.

Caughron, D.E., et al., "Unique Crosslinking Pill in Tandem with Fracture Prediction Model Cures Circulation Losses in Deepwater Gulf of Mexico", SPE 74518, Feb. 26-28, 2002, pp. 1-8, IADC/SPE Drilling Conf., Dallas, TX.

DuPriest, F.E., "Fracture Closure Stress (FCS) and Lost Returns Practices", SPE 92192, Feb. 23-25, 2005, pp. 1-11, SPE/IADC Drilling Conf., Amsterdam, The Netherlands.

Floyd, J.C., "Diaseal M Works in Oil Base Mud", Aug. 20-21, 1990, p. 18, South American Oil Gas Reporter, v. 33, No. 8.

Fuh, G-F, et al., "Further Development, Field Testing, and Application of the Wellbore Strengthening Technique for Drilling Operations," SPE 105809, Feb. 20-22, 2007, pp. 1-12, 2007 SPE/IADC Drilling Conf., Amsterdam, The Netherlands.

Gomes, J.S. et al., "The Role of Geomechanics at Early Stages of Field Development: A Case Study", SPE 101425, Nov. 5-8, 2006, pp. 1-12, 2006 Abu Dhabi Intl Petroleum Exh. & Conf., Abu Dhabi, U.A.E.

Ivan, C.D., et al., "Aphron-Base Drilling Fluid: Evolving Technologies for Lost Circulation Control", SPE 71377, Sep. 30-Oct. 1, 2001, pp. 1-6, 2001 SPE Annual Technical Conf. & Exh., New Orleans, LA.

Kunze, K.R., et al., "Accurate In-Situ Stress Measurements During Drilling Operations", SPE 24593, Oct. 4-7, 1992, pp. 1-8, 67th Annual Technical Conf. & Exh. of the Society of Petroleum Engineers, Washington, DC.

Lummus, J.L., "Squeeze Slurries for Lost Circulation Control", Sep. 1968, pp. 59-64, South Petrol. Eng., v. 40, No. 10.

Mody, F.K. et al., "Borehole-Stability Model to Couple the Mechanics and Chemistry of Drilling-Fluid/Shale Interactions", SPE 25728, Nov. 1993, pp. 1093-1101, JPT.

Pitman, E.D., "Relationship of Porosity and Permeability to Various Parameters Derived from Mercury Injection-Capillary Pressure Curves for Sandstone", 1992, pp. 191-198, AAPG Bull., v. 76, No. 2.

Morita, N., et al., "Theory of Lost Circulation Pressure", SPE 20409, Sep. 23-26, 1990, pp. 43-58, 65th Annual Technical Conf. & Exh. of the Society of Petroleum Engineers, New Orleans, LA.

Radenti, G., "High Fluid Loss Slurry Plugs Thief Zones", May 1969, pp. 114-116, South World Oil, v. 168, No. 6.

Sanad, M., et al., "Numerical Models Help Analyze Lost-Circulation/Flow Events and Frac Gradient Increase to Control an HPHT Well in the East Mediterranean Sea", SPE 87094, Mar. 2-4, 2004, pp. 1-14, IADC/SPE Drilling Conf., Dallas, TX.

Song, J.H., et al., "Preventing Mud Losses by Wellbore Strengthening", SPE 101593, Oct. 3-6, 2006, pp. 1-3, 2006 SPE Russian Oil & Gas Technical Conf. & Exh., Moscow, Russia.

Soroush, H. et al., "Investigation into Strengthening Methods for Stabilizing Wellbores in Fractured Formations", SPE 101802, Sep. 24-27, 2006, pp. 1-8, 2006 SPE Annual Technical Conf. & Exh., San Antonio, TX.

Sweatman, R., et al., "Wellbore Stabilization Increases Fracture Gradients and Controls Losses/Flows During Drilling", SPE 88701, Oct. 10-13, 2004, pp. 1-15, 11th Abu Dhabi Intl Petroleum Exh. & Conf., Abu Dhabi, U.A.E.

Tare, U.A., et al., "Understanding Chemical-Potential-Related Transient Pore-Pressure Response to Improve Real-Time Borehole (in)Stability Predictions", SPE 65514, Nov. 6-8, 2000, pp. 1-8, 2000 SPE/Petroleum Society of Cim Int'l Conf. on Horizontal Well Technology, Calgary, Alberta, Canada.

Traugott, D., et al., "Increasing the Wellbore Pressure Containment in Gulf of Mexico HP/HT Wells", SPE 96420, Oct. 9-12, 2005, pp. 16-24, 2005 SPE Annual Technical Conf. & Exh., Dallas, TX.

Webb, S., et al., "New Treatments Substantially Increase LOT/FIT Pressures to Solve Deep HTHP Drilling Challenges", SPE 71390,

(56) References Cited

OTHER PUBLICATIONS

Sep. 30-Oct. 3, 2001, pp. 1-12, 2001 Annual Technical Conf. & Exh., New Orleans, LA.
Whitfill, D.L., et al., "New Design Models and Materials Provide Engineered Solutions to Lost Circulation", SPE 101693, Oct. 3-6, 2006, pp. 1-13, 2006 SPE Russian Oil & Gas Technical Conf. & Exh., Moscow, Russia.

Zhang, J., et al., "Stressed-Shale Drilling Strategy—Water-Activity Design Improves Drilling Performance", SPE 102498, Sep. 24-27, 2006, pp. 385393, 2006 Annual Technical Conf. & Exh., San Antonio, TX.
*European Search Report*, dated Feb. 7, 2008, RS 115805, US 96204007.
*International Search Report*, dated Oct. 1, 2008, PCT/US08/07539.

* cited by examiner

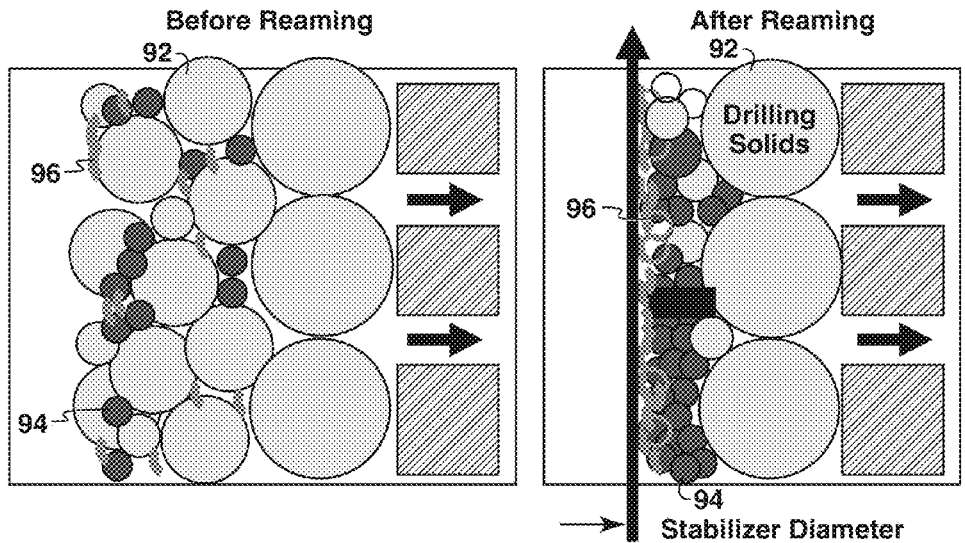
*FIG. 10a*  *FIG. 10b*
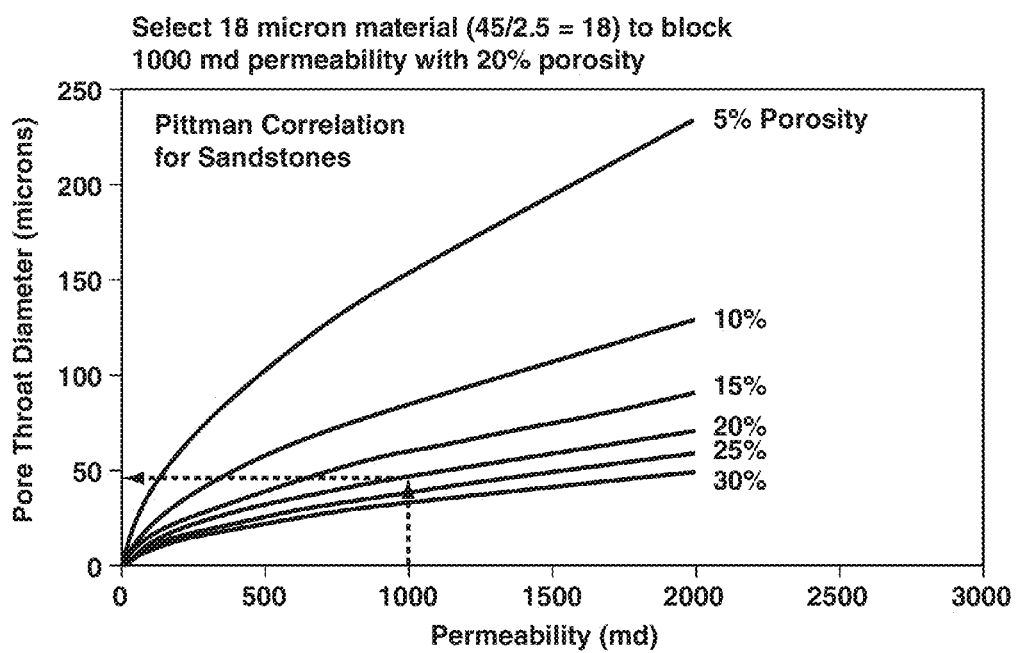
*FIG. 11*

METHOD FOR CONTROLLING LOSS OF DRILLING FLUID

CROSS-REFERENCE TO RELATED APPLICATIONS

The present application is a divisional of U.S. application Ser. No. 12/663,470, filed 7 Dec. 2009, which is the National Stage of International Application No. PCT/US08/07539, filed 17 Jun. 2008, which claims the benefits, under 35 U.S.C. §119(e), of U.S. Provisional Application Ser. No. 60/962,040, filed Jul. 26, 2007, entitled "Method for Controlling Loss of Drilling Fluid" and of U.S. Provisional Application Ser. No. 61/003,640, filed Nov. 19, 2007, entitled "Method for Controlling Loss of Drilling Fluid", each of which is incorporated herein by reference.

FIELD

This invention pertains to drilling of wells into the earth. More particularly, methods and systems are provided for controlling loss of drilling fluid ("lost returns") from a wellbore during the drilling process.

BACKGROUND

This section is intended to introduce the reader to various aspects of art, which may be associated with exemplary embodiments of the present techniques, which are described and/or claimed below. This discussion is believed to be helpful in providing the reader with information to facilitate a better understanding of particular aspects of the present techniques. Accordingly, it should be understood that these statements are to be read in this light, and not necessarily as admissions of prior art.

In the drilling of wells (for example, oil and gas wells) using the rotary drilling method, drilling fluid is circulated through a drill string and drill bit and then back to the surface by way of the wellbore being drilled. The fluid is processed to remove drill solids and to maintain desired properties before is it re-circulated to the well. The drilling fluid may have multiple purposes, including 1) cooling and/or lubricating the drill bit; 2) maintaining hydrostatic pressure on the subterranean formation through which the wellbore is drilled thereby preventing pressurized formation fluid from entering the wellbore; and 3) circulating cuttings out of the wellbore. During drilling operations, some amount of fluid will be lost, which lost amount is often referred to as "lost returns." Some forms of loss are considered acceptable and are expected. For example, some amount of drilling fluid is lost due to the permeability of the formation. As mud flows into the small openings in the rock, the solids within the fluid will eventually plug the openings and form a filter cake on the wellbore wall. The loss volumes are small and decline with time. Additionally, drilling fluids may be lost upon formation of a fracture in the wellbore wall providing an outlet for the drilling fluids. The solids in the mud are not capable of plugging the open gap and losses can be unexpected, uncontrollable, and/or in unacceptable volumes.

The mechanical properties of the subterranean formations into or through which wellbores are drilled will vary. These properties, and the fluid pressure in the wellbore, determine whether losses will occur, and the nature of the loss. For example, the permeability of the formation will determine how quickly the filter cake forms on the wellbore wall and how much drilling fluid is lost before an effective filter cake is formed. The term "spurt loss" is generally used to refer to the volume of drilling fluid that passes through a filter medium (here, the permeable wellbore wall) prior to the formation of a controlling filter cake. Conventionally, drilling fluids have been designed to minimize the spurt loss through the permeable wellbore wall. The resulting filter cakes form quickly and are generally very thin. Conventional drilling fluids have been optimized in a number of different ways for the formation of filter cake on wellbore walls. However, these attributes are not effective in stopping losses to fracture formation. The problem of lost returns due to fracture formation is treated by the industry in a variety of ways, but solutions are still needed that are more effective and predictable.

Another important property of subterranean formations is the formation integrity, which varies along the length of the wellbore. The formation integrity is often a function of several factors, including the composition of the formation and the depth of the formation. The formation integrity is defined as the wellbore pressure at which a fracture will form in the wellbore wall and fluid will be lost. When the wellbore pressure exceeds the formation integrity the rock is forced open and mud flows into the opening. The pressure required to open the wellbore to create a fracture is largely equal to the stress stored in the surrounding rock that is holding the wellbore closed. This stress comes from the weight of the rock and fluids above the particular depth of interest. This weight is referred to as overburden. Rock properties also play a role because the stress that will be created by a given overburden varies with specific rock properties. For example, a formation buried deeply in the earth may have 10000 psi of overburden, which may create a minimum rock stress of 7000 psi in a given formation. The wellbore pressure required to force the wellbore wall open will typically be only slightly higher than 7000 psi. The shape of the opening will be narrow and tall and is referred to as a fracture. Because the overburden and rock properties will vary from one interval, or region of the formation, to another, the integrity of the formation varies along the length of the wellbore. Drilling may progress well in intervals with higher containment stress, but fractures and corresponding drilling fluid losses may occur as strata or intervals are penetrated where the formation integrity is lower.

Heretofore, the opening of a fracture has been discussed in relation to a formation's integrity. The formation integrity at a particular point in the wellbore may also be referred to as the fracture gradient at that location. The fracture gradient is often expressed as pressure divided by depth and corresponds to the pressure the wellbore wall is able to sustain before a fracture is created. The fracture gradient of a particular interval or region of a wellbore equals the pressure required to initiate fracture growth divided by depth of the location. The fracture gradient of a particular interval may also be expressed in "equivalent mud weight" (EMW). This is the density that a column of fluid must have to exert a given gradient of pressure, and may be expressed in pounds per gallon (ppg). If a fracture is created and forced open, the two faces of the fracture continue to push back and attempt to close with a force equal to the surrounding rock stress. This force is referred to as Fracture Closure Stress, or "FCS".

A primary source of the pressure that may induce a fracture opening is the hydrostatic pressure applied on the wellbore wall by the drilling fluid being circulated in the wellbore. One important property of the drilling fluid is the fluid's mud weight or mud density, which is its mass per unit volume. The drilling fluid's mud weight is important as it determines the hydrostatic pressure in the well at any given depth, which prevents inflow into the well and collapse of the wellbore, and which causes fractures when the hydrostatic pressure exceeds the formation integrity or fracture gradient. When a drilling fluid is being circulated, additional pressure is applied against the wellbore wall due to friction-induced pressure drop. Accordingly, drilling operations often consider the equivalent circulating density (ECD) of a drilling fluid, which equals the dynamic pressure drop in the annulus from the point being considered to the surface, plus the static head of the fluid due to its density. Because the drilling fluid in the wellbore may at different times be circulating in the wellbore or stationary in the wellbore, determining and controlling the hydrostatic pressure applied by the drilling fluids under both conditions is important for maintaining the desired integrity of the wellbore (avoiding fractures from overpressure and collapse from underpressure).

Conventionally, a section of wellbore is drilled to that depth where the ECD creates a wellbore pressure that approaches the fracture gradient of the formation adjacent the wellbore. For example, the wellbore may be drilled into an interval known to have lower integrity (due to rock composition, depletion, or other reasons) and correspondingly lower fracture gradient. At that point, a string of casing is installed in the wellbore to stabilize the formation in the previously drilled interval, such as to prevent collapse of the wellbore and/or to prevent inflow of formation fluids, and then the wellbore pressure is reduced to the level tolerable by the lower integrity formation at greater depths. Similarly, if a newly approached interval requires a higher wellbore pressure than a previous interval can support without creating fractures, a casing may be installed to stabilize and/or isolate the previous interval against the increased wellbore pressure required to continue drilling. In general, each added casing string has a smaller diameter than the previous string and can be very expensive and time-consuming to install. In some instances, deep wellbores become impractical to drill due to the number of casing strings needed to complete the well and the reduction in casing and hole size that occurs with each string installed.

FIG. 1 is a graph of depth in meters versus expected pore pressure (line 2) in a formation strata or a formation stratum to be intersected during drilling of a well, expected fracture gradient (line 3) in the strata, and an ECD (line 4) of the drilling fluid to be used. Safe drilling procedures require the ECD (line 4) to lie between the pore pressure and the fracture gradient (lines 2 and 3). At the right side of the FIG. 1, a casing plan is shown based on these curves. The depth of intermediate six casing strings 5 are planned to prevent lost returns, by isolating the strata having low fracture gradient "behind pipe," and are shown with the casing shoes for each of the six strings at depths 1a, 1b, 1c, 1d, and 1e.

In the example of FIG. 1, lost returns to the strata in the regions designated "Zone A," "Zone B" and "Zone C" would be expected because the pressure applied to circulate the well (ECD) is greater than the formation integrity in these three zones with low fracture gradient. The risk of opening a fracture is greatly exacerbated in intervals of the wellbore that have been partially depleted by production resulting in reduced pore fluid pressures, as illustrated in depleted Zones A, B, and C in FIG. 1. Lower fluid or pore pressure in an interval or stratum decreases the stress holding the borehole closed and the fracture gradient in the stratum.

A high lost returns rate into fractures may also occur when there has been no depletion, particularly in wells that are drilled directionally at high angle. When vertical wells are drilled, the integrity tends to increase with drill depth because integrity is increased by the weight of the formations above a given point. In contrast, the integrity in high angle directional wells does not increase as rapidly because the trajectory is generally sideways and the well is not penetrating deeper into the earth. In the extreme example of a horizontal well, there is no increase in vertical depth at all, and there is no change at all in integrity as drilling progresses. However, the circulating pressure continues to increase due to the increasing length of the borehole. When the directional wellbore reaches a certain length, its circulating pressure may exceed the integrity of the formation and losses will occur. When the circulating pressure in a high-angle directional well exceeds the formation integrity, continued drilling may result in unacceptably high lost returns, even though geologic objectives may not have been met. The economic impact of these types of losses may increase as deep water fields mature and pressures in produced intervals decline. Deep water fields are typically developed in formations with low native integrity and with wellbores drilled to great distances from the central structure with high circulating pressures. There are currently few depleted reservoirs in deep water, because the industry has only recently developed the technology to develop these fields. However, further depletion of fluids from these reservoirs may further reduce the fracture gradient in some zones. The combination of high circulating pressures in the high-angle, extended-reach wells and lower fracture gradients common in deep water may make it uneconomical to develop large deposits unless new drilling technology is available.

Losses may also occur when the fluid density required to prevent the wellbore from collapsing in areas of low strength rock exceeds the integrity. Directional wells are more prone to collapse and thus require higher fluid density to drill successfully. The density required to stabilize the wellbore is referred to as the "stability mud weight". The combination of the higher fluid density requirement for stability and high circulating pressure due to the wellbore length causes losses to be more likely in high-angle, long-throw wells.

If it is observed that returns are lost to a fracture when drilling into a zone, in addition to installing costly casing, two major response avenues are available: 1) reduce the wellbore pressure, and 2) increase the fracture gradient of the formation to exceed the wellbore pressure. If the borehole pressure is reduced below the FCS, the stress around the wellbore will force the fracture closed and fluid losses will stop. If, for a variety of reasons, the pressure cannot be reduced, the borehole pressure will continue to extend the fracture, and losses continue. Consequently, increasing the fracture closure stress (FCS) is the preferred avenue.

It is known that if a fracture is formed that intersects the wellbore and extends into the rock around the wellbore and that fracture is held open by solid material in the fracture, then the fracture gradient at the wellbore is increased. (F. E. Dupriest, "Fracture Closure Stress (FCS) and Lost Returns Practices," SPE/IADC 92192, Society of Petroleum Engineers, 2005). The great majority of lost circulation treatments in industry work to enhance the wellbore fracture gradient by forming a fracture that is held or propped open. Widening the fracture causes the rock in the immediate region of the wellbore to be compressed, which causes it to push back with greater stress. Thus, the fracture-opening pressure (integrity) increases. The stress travels around the wellbore wall and increases the opening pressure to some degree in all directions. Fractures can be widened by building pressure in the wellbore or within the fracture itself.

The majority of conventional attempts to increase the fracture closure stress apply a discrete treatment to the wellbore. The conventional discrete treatment consists of stopping drilling and then pumping a limited volume of fluid called a "pill" containing Lost Circulation Material (LCM) down the wellbore in an attempt to stop or slow the loss of drilling fluid.

The LCM material is typically larger in size than solids in conventional drilling fluids. The LCM materials interact with the newly formed fracture to prevent additional fluid loss through that fracture. The LCM widens the fracture resulting in an increased fracture closure stress in the region of the wellbore adjacent to the fracture. If the treatment is not successful, casing must be set across the loss zone, which is expensive and time-consuming. There is also the additional expense of the lost fluid.

The vast majority of historical treatments have been discrete operations conducted either when losses first occur, or after the formation interval is fully exposed and drilling stops. Accordingly, fluid losses occur while the drilling progresses through the interval and costs are incurred while the drilling is stopped for the discrete treatment. The success rate in discrete treatments has improved, but the industry has lacked reliable and practical processes for building stress as drilling progresses without interrupting the drilling process.

There are several reasons why a continuous process is desirable. Discrete processes are often effective, but they are used after the losses have already occurred. The drilling must stop because if fluid cannot be circulated back to the surface, the drill cuttings that are being created cannot be removed from the well. Also, drilling equipment costs continue during the non-productive time required to stop and treat the loss. At current rig rates, this non-productive time may total tens to hundreds of thousands of dollars per day. Other effects may be of even greater concern. When the loss occurs, the bottomhole pressure falls to equal the closing stress between the fracture faces (FCS). The drop in bottom hole pressure 1) may cause the borehole to collapse so that the interval must be re-drilled entirely, or 2) it may allow an influx of hydrocarbon from another zone into the wellbore if it happens to have a pore pressure greater than the reduced bottom hole pressure. This influx results in risky and time-consuming well control operations. A continuous stress-building process minimizes the loss so that it is not necessary to stop drilling, and it also eliminates the drop in bottomhole pressure that can precipitate borehole collapse or a well-control event.

Conventional drilling fluids are designed to have some degree of control over the flow of fluid to the formation permeability, which is referred to as "filtration loss". When a permeable zone is penetrated, the water or oil that forms the base fluid starts to travel into the pore throats of the formation and the majority of the solids are stripped out and left behind as a filter cake on the wall of the hole. The fluid lost is referred to as filtrate. In common practice, the drilling fluid system is designed to form this filter cake quickly so that the surface is sealed before the cake grows too thick. The purpose of the seal is to reduce the loss of filtrate and to minimize the growth in cake thickness. When a large material, such as LCM, is added to a drilling fluid, the filter cake formed becomes more permeable due to the entrainment of these larger particles. This results in thicker cakes, which increases the potential for stuck pipe. Consequently, operators have avoided adding larger materials to the entire drilling fluid system to avoid the risks associated with a thick filter cake. When high loads of LCM have been used in the past, it has been in conjunction with a base fluid having intrinsically low filtrate loss. However, such attempts at using LCM in a drilling fluid with low filtrate loss characteristics have proven largely unsuccessful at arresting fracture growth.

Two models for lost returns treatment processes with particulate materials (rather than the smaller solid fines of conventional drilling fluids) have been proposed; both focus on the use of specifically sized particles combined with fluid loss control additives to constrain fracture growth. One model is proposed in U.S. Pat. No. 5,207,282 (the '282 Patent), which discloses a loss prevention material (LPM) method that uses a combination of particle sizes to create a bridge near the tip of the propagating fracture to prevent fracture growth. The method requires the use of particle sizes (250-600 micron range) in specific concentrations to form a plug, as asserted in the '282 Patent, near the fracture tip that results in the desired stress increase. The '282 Patent states that "[m]inor amounts of particles outside the critical size range can be tolerated, but the effectiveness is primarily due to presence of an effective amount of particles in the critical size range." The method also requires filtration loss to the fracture tip be limited so that a low pressure region is created at the extreme tip.

A second proposed model is discussed in U.S. Pat. Application Pub. No. 2006/0254826, which discusses a "stress cage" concept that involves increasing the fracture gradient around a wellbore by creating and packing the opening to the fracture at its intersection with the wellbore. The stress cage concept is similar to the LPM process of U.S. Pat. No. 5,207,282 in that it is also dependent on the use of specifically designed particle sizes to arrest fracture growth. In the stress cage concept, large particles are used that will not enter the fracture opening at the fracture width corresponding to the desired stress increase. A full range of smaller particles are also included to block the area between the larger particles. Bridging materials in the size range of 25 to 2000 micrometers are proposed. Since the large particles cannot enter the fracture and the smaller particles cannot pass the large particles, it is said that material quickly bridges across the fracture opening. The system is also designed to have very low fluid loss (less than 2 ml/30 minutes) so that very little carrier fluid can pass through the particles into the fracture to pressurize it. The concept is that if the particles cannot enter, and the filtrate cannot pass through, pressure cannot build within the fracture. The pressure within the wellbore will still drive the fracture open but the bridge within the opening prevents pressure transmission. The bridge of solids particles sustains the increased width and associated increase in FCS. Regardless of treatment type, it has been shown that the stress that results from a given fracture width at the wellbore declines as the fracture length extends. The implication for the stress cage method is that it is necessary for the bridge to form very rapidly in order to arrest fracture growth before the fracture lengthens to the point that great width must be blocked in order for the process to succeed. The designed particles may not be large enough to bridge this width, or the required particle size may not be practical to circulate through the components of a typical drilling system. The stress cage concept recognizes that permeability of the surrounding rock plays a role. It has been assumed that if the rate of filtrate leakage through the bridge exceeds the rate of leakage to the permeability exposed in the fracture, pressure will eventually build in the fracture so that it lengthens and the stress at the wellbore will decrease. As a result, U.S. Patent Application Pub. No. 2006/0254826 states the high temperature high pressure (HT/HP) fluid loss from the drilling mud should be less than 2 ml/30 minutes, presumably because this is believed to be adequate control for typical fracture permeability.

A need exists for a process to control lost returns continuously as a well is drilled that is applicable for drilling though low- and/or high-permeability zones that may be depleted in pressure or have low FCS for other reasons. The process would preferably require only products normally used in drilling operations. Because of significant uncertainties in downhole conditions, it is essential the process be sufficiently robust to succeed if actual conditions vary from assumed design conditions. Examples of uncertainties that must be successfully accommodated are the fracture width required to achieve the desired stress increase, fracture length, rock properties, permeability, pore pressure, and variability in execution of field procedures.

SUMMARY

Methods for drilling while continuously treating for lost returns are provided. A high-fluid-loss drilling fluid is used along with a particulate material selected to form an immobile mass in a fracture formed while drilling with the high-fluid-loss drilling fluid. In some implementations, drilling with the high-fluid-loss drilling fluid may be accompanied by a remedial treatment for eliminating a thick filter cake that may be formed on the face of the borehole during drilling.

As one exemplary implementation, methods within the scope of the present technology include determining a design width of a fracture in a wellbore wall of a formation, preparing a drilling fluid, and drilling a wellbore into the formation using the drilling fluid. The drilling fluid comprises an initial solids content in a carrier fluid. The fluid is designed so that spurt loss is enhanced. The enhanced spurt loss allows the solids content of the drilling fluid to become concentrated as it enters the propagating fracture so that an immobile mass is left behind within the fracture. The immobile mass prevents further growth of the fracture. In some implementations, the solids in the drilling fluid have a size distribution selected based at least in part on the determined width of the fracture. For example, at least 50 percent of the solids may have a size less than the determined width of the fracture at the intersection with the wellbore.

Additionally or alternatively, methods within the scope of the present disclosure may include preparing a drilling fluid having an API spurt loss greater than about 10 ml and comprising at least 10 percent by volume particulate treatment material in a carrier fluid. The high spurt loss concentrates the particulate treatment material to form an immobile mass in a fracture formed while drilling a borehole. The drilling fluid is circulated in the borehole while drilling in a formation.

In some implementations, the drilling fluids of the present methods may be designed and/or prepared based at least in part on information known about the formation in which the well is being drilled. For example, the permeability of the formation and the properties of the drilling fluid may be considered in determining which particles, solids, fines, or other materials to include in the drilling fluid and in what concentration and/or size distribution. In some implementations, the drilling fluids and solids used therein may be selected and/or designed based on formation characterizations such as high permeability or low permeability. Additionally or alternatively, specific properties of the formation and the fluids and solids may be analyzed with the assistance of one or more models to aid in the selection of drilling fluid compositions.

BRIEF DESCRIPTION OF THE DRAWINGS

The foregoing and other advantages of the present technique may become apparent upon reading the following detailed description and upon reference to the drawings in which:

FIG. 10a is a sketch of a thick filter cake resulting from high fluid loss; FIG. 10b shows results of a reaming treatment of the filter cake.

FIG. 11 is a correlation of pore throat diameter and permeability of sandstone.

DETAILED DESCRIPTION

In the following detailed description, the specific embodiments of the present invention will be described in connection with its preferred embodiments. However, to the extent that the following description is specific to a particular embodiment or a particular use of the present techniques, this is intended to be illustrative only and merely provides a concise description of the exemplary embodiments. Accordingly, the invention is not limited to the specific embodiments described below, but rather, the invention includes all alternatives, modifications, and equivalents falling within the true scope of the appended claims.

Figure 2A:
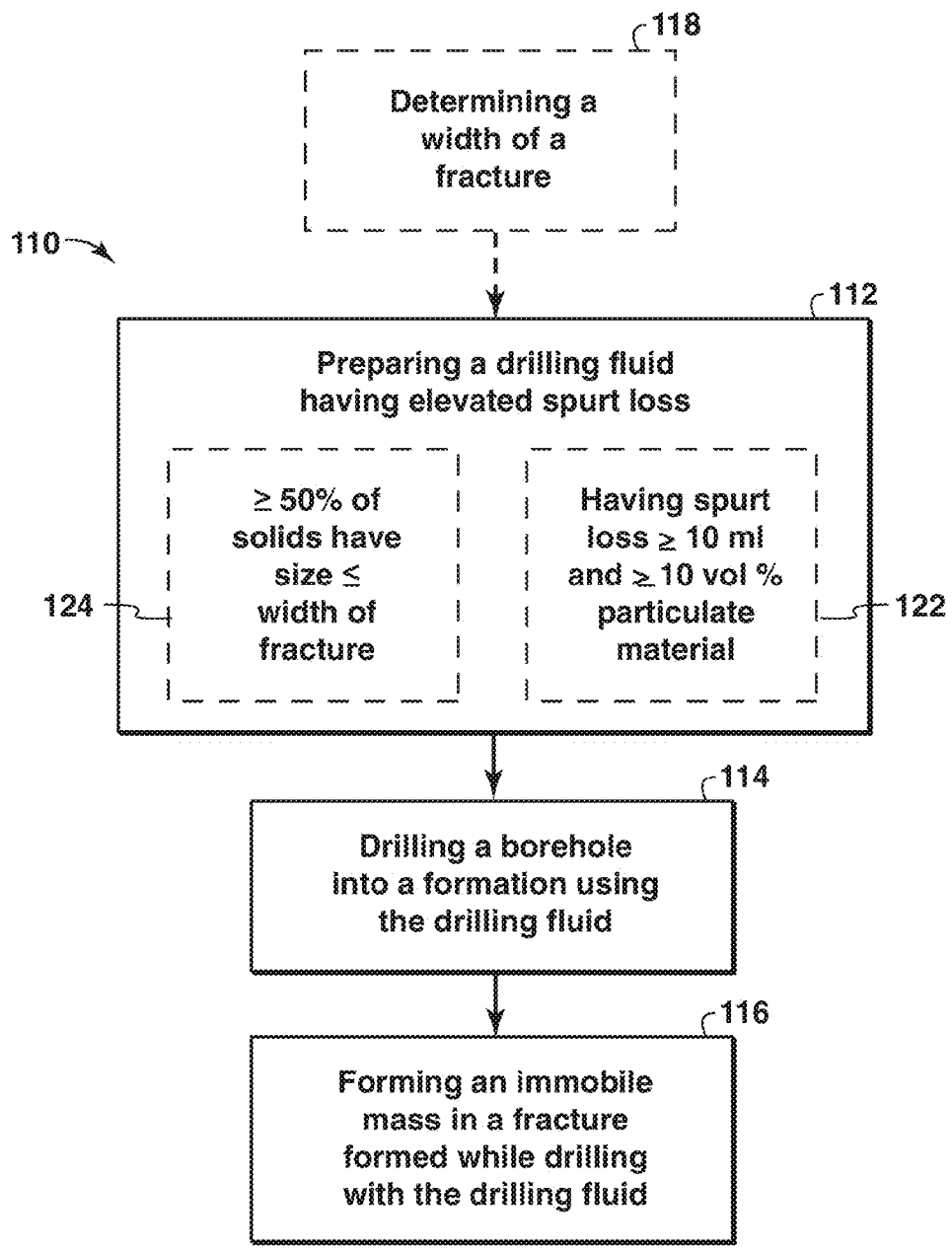
FIG. 2a is an exemplary flow chart of drilling methods in accordance with aspects of the present techniques.

Turning to FIG. 2a, a flow chart is shown of several steps associated with one aspect of the present techniques for drilling a borehole into a subterranean formation. The method illustrated in FIG. 2a represents one implementation of a technique referred to herein as a Drill Stress Fluid (DSF) drilling method 110. The specifics of the steps illustrated in FIG. 2a will become more apparent throughout this description and it is presented here in general terms for an overview and for reference through the remainder of this description. The DSF method 110 includes, at block 112, preparing a drilling fluid having enhanced or high spurt loss; at block 114, drilling a borehole into a formation using the drilling fluid;

and at block 116, forming an immobile mass in a fracture formed while drilling with the drilling fluid. The DSF method 110 may include multiple additional steps. As one exemplary and complementary step that may be included in a DSF method within the present disclosure, FIG. 2a illustrates at block 118 that the method optionally may include determining a width of a fracture, such as the width of a fracture at the intersection of the wellbore wall or the desired width to which such fracture would be expanded through the present methods. Additionally or alternatively, the illustrated steps of the DSF method 110 may be more thoroughly defined. For example, FIG. 2a illustrates that preparing a drilling fluid at 112 optionally may include, at 124, preparing a drilling fluid wherein at least about fifty percent of the solids in the drilling fluid have a size less than the determined width of the fracture. As another example, FIG. 2a illustrates that preparing a drilling fluid optionally may include, at 122, preparing a drilling fluid having a spurt loss of at least about 10 ml and at least about 10 percent by volume particulate material. Other aspects of the DSF method 110 will be understood from the remainder of the description herein.

Figure 2B:
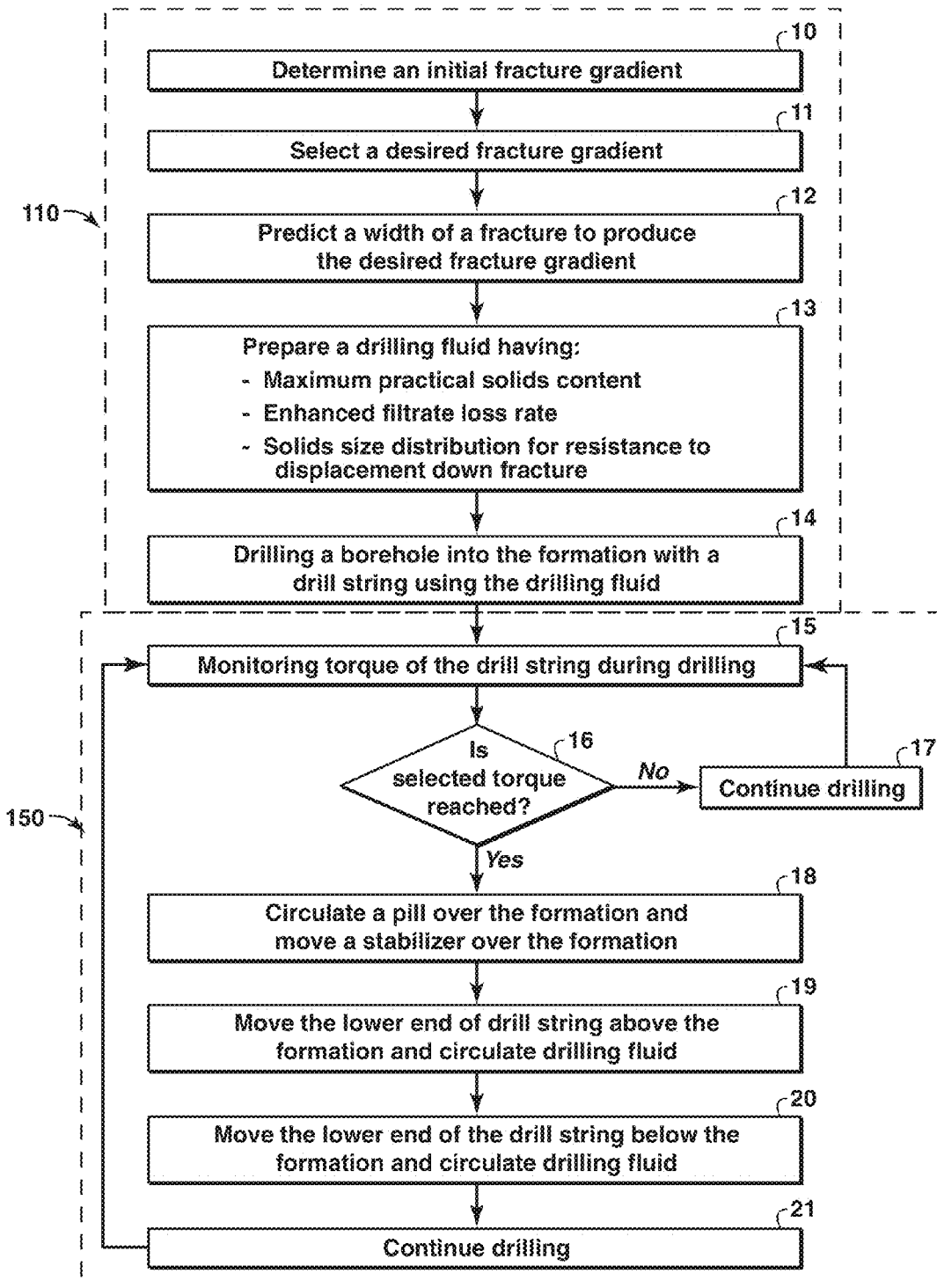
FIG. 2b is an exemplary flow chart of additional drilling methods in accordance with aspects of the present techniques.

FIG. 2b similarly provides an overview of methods within the scope of the present invention. In FIG. 2b, the DSF method 110 is illustrated in slightly different terms further illustrating the variations to the DSF method 110 within the scope of the present disclosure. Additionally, FIG. 2b illustrates the DSF method 110 in connection with a Drill and Stress Treatment (DST) method 150 disclosed herein. While the DSF methods 110 of the present disclosure may be used together with the DST methods 150 herein, such cooperation is not required. Similar to FIG. 2a, the present discussion of FIG. 2b is intended to provide an overview of the DSF methods 110 and the DST methods 150 described in more detail hereinbelow. In block 10, an initial fracture gradient of the formation is calculated or estimated. In block 11, a desired fracture gradient in the formation is selected. In block 12, a predicted width of a fracture at its intersection with the borehole that will produce the desired fracture gradient in the formation, is determined by estimation or calculation. In block 13, a drilling fluid is prepared that has characteristics that include (1) maximum practical total solids content; (2) enhanced ability to lose carrier fluid to develop an immobile mass; and (3) particles sized to increase resistance to displacement down the narrow fracture. The primary function of the solids is to prevent growth of the fracture by forming an immobile mass. In block 14, the drilling fluid is used in drilling the borehole in the formation.

Exemplary components of the DST method 150 are additionally illustrated in FIG. 2b. The DST method 150 may be implemented when sticking is feared and/or observed while using the DSF method 110. Accordingly, the DST methods 150 include monitoring torque (block 15) on the drill string during drilling with the drilling fluid. Other behaviors that may indicate significant cake growth is occurring may also be monitored. At block 16, it may be determined if a selected torque is reached. If the selected torque has not been reached, the drilling operation continues (block 17), while continuing to monitor the torque (block 15). If a selected torque is reached, a DST pill of treatment fluid is circulated over the formation (block 18), or more particularly in the wellbore in the interval to be treated, while rotating and reciprocating stabilizers in the borehole across the interval to be treated. The DST pill preferably has an API fluid loss of less than 6 ml/30 min. The DST methods 150 preferably further comprise the step of moving the lower end of the drill string (block 19) to above the formation interval being treated and circulating the drilling fluid for a selected time and thereafter moving the lower end of the drill string (block 20) below the formation while monitoring for drag across the treated interval. Drilling continues while monitoring torque (blocks 21 and 15). If a second selected torque is reached, the steps of circulating a pill, moving a stabilizer in the borehole, moving the lower end of the drill string above the formation and below the formation while circulating drilling fluid are repeated (blocks 18, 19, and 20). Other aspects of the DST method 150 will be understood from the remainder of the description herein.

Figure 3:
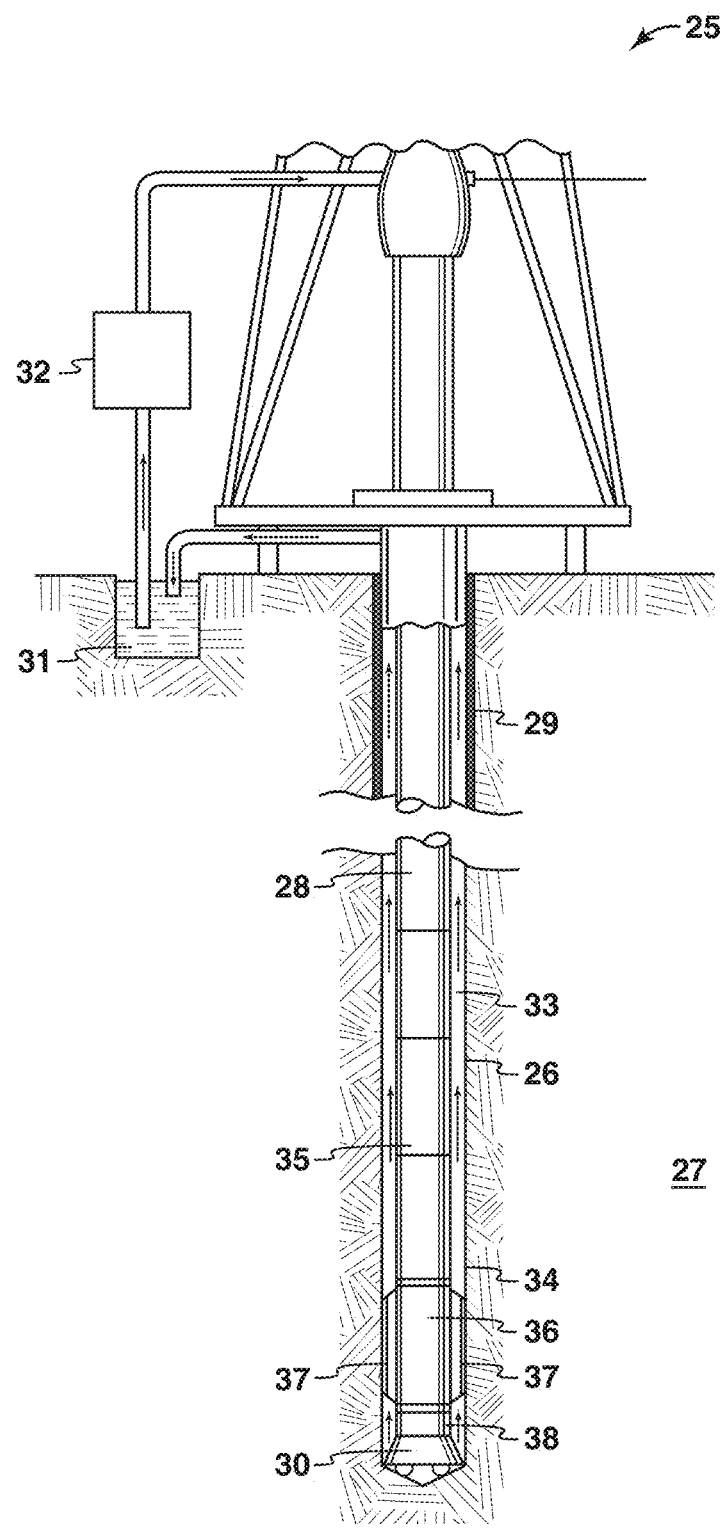
FIG. 3 is a schematic of a typical drilling system and related environment in which the present techniques can be utilized.

FIG. 3 illustrates a typical drilling system and related environment in which the present invention can be utilized to advantage. Land-based rig 25 is positioned over wellbore 26 penetrating subsurface formation 27. Although a vertical, land-based well is depicted in FIG. 3, those skilled in the art given the benefit of this disclosure will appreciate, however, that the present invention also finds application in other drilling applications, such as directional drilling and offshore drilling.

Drill string 28 is suspended within wellbore 26 having casing 29 at the upper end and being uncased at lower end. The lower end of the drill string 28 includes drill bit 30. Drilling fluid or mud 31 is pumped by pump 32 to the interior of drill string 28, inducing the drilling fluid to flow downwardly through drill string 28. The drilling fluid exits the drill string 28 through ports in drill bit 30, and then circulates upwardly through the annular space 33 between the outside of the drill string and the wall of the wellbore as indicated by the arrows. The drilling fluid performs various functions to facilitate the drilling process, such as lubricating the drill bit 30 and transporting cuttings generated by the drill bit during drilling. The cuttings and other solids mix within the drilling fluid to create a "filter cake" 34 that also performs various functions, such as coating the wellbore wall.

Drill string 28 further includes a bottom hole assembly (BHA), generally referred to as 35. The BHA may include various modules or devices with capabilities, such as measuring, processing, or storing information, and communicating with the surface. As shown in FIG. 3, the BHA 35 includes the bit 30, stabilizer (or centralizer) 36 having rigid blades 37 extending radially therefrom, and lower sections of heavy-walled pipe 38 called drill collars. FIG. 3 shows only one stabilizer 36; the BHA 35 can have multiple stabilizers. Stabilizer 36 comprises one or more radially extending blades 37 which help mitigate the tendency of the drill string to "wobble" and become decentralized as it rotates within the wellbore. The stabilizer blades 37 also scrape against the wellbore and help control buildup of filter cake.

Figure 4A:
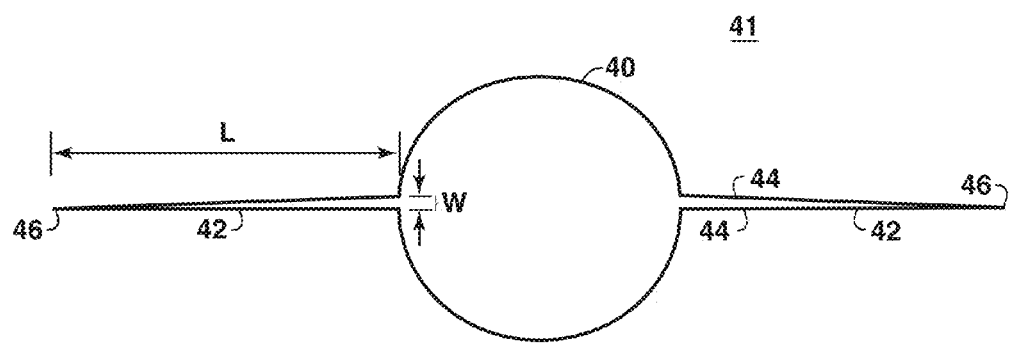
FIG. 4a is a plan view of a vertical fracture around a wellbore.

Referring to FIG. 4a a plan view of wellbore 40, which is being drilled through rock stratum 41, is shown at a depth where vertical fracture 42 has been formed in stratum 41 because fluid pressure in wellbore 40 was greater than the integrity in stratum 41. Fracture 42 has width W at the wellbore, length L in each direction away from the wellbore and fracture faces 44 along the fracture to tip 46. Leakoff of fluid occurs along fracture faces 44. Tip 46 will be extended if pressure in the fracture at the tip is greater than the rock stress in stratum 41 holding the tip closed. During a lost returns event without the methods of the present disclosure, the pressure exerted by the drilling fluid extends the tip 46 and causes the fracture to grow in length. The width will remain relatively narrow, but will widen as the fracture continues to grow in length.

Figure 4B:
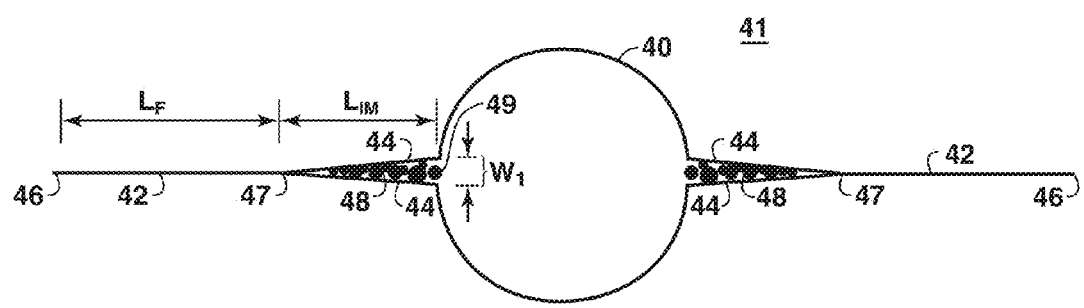
FIG. 4b is a plan view of the fracture filled with an immobile mass of particles.

FIG. 4b is similar to FIG. 4a except that immobile mass 48 is formed in fracture 42. Immobile mass 48 occupies the length $L_{IM}$ in FIG. 4b. Formation of the immobile mass 48 occurs due to loss of carrier fluid (not shown in the drawings), which is referred to as filtrate after it is lost. Loss of the filtrate occurs through two paths. First, leakage will occur into the permeability of the fracture faces 44 across the partial length, $L_{IM}$. Second, as the solids become immobile, the filtrate may extrude through the solids to the tip 46. As the carrier fluid is lost as filtrate, the solids become concentrated in the fracture to form the immobile mass 48, which typically begins to form at some point in the fracture spaced from the fracture tip 46, the space being illustrated as length $L_F$. The formation of the immobile mass 48 in the fracture 42 divides the fracture into two regions: 1) the immobile mass region referenced as $L_{IM}$; and 2) the filtrate region referenced as $L_F$. The transition between the immobile mass region and the filtrate region is referred to herein as vertex 47. As the immobile mass grows through the continued filtration of carrier fluid through the immobile mass 48, the immobile mass preferably grows in the direction of the wellbore or away from the fracture tip 46. It has been observed that if the length of the immobile mass region $L_{IM}$ does not increase, loss of whole mud from the wellbore is effectively prevented. As filtrate travels through the immobile mass and the build up of pressure in the filtrate region $L_F$ equals the minimum rock stress in that region, the tip 46 will open and may grow in length to relieve the pressure buildup. However, the width of the fracture over the length of region $L_F$ will be extremely narrow, on the order of the width required to allow a fluid to pass.

It has been found that if the solids are not allowed to press against the fracture beyond the immobile mass, such as at or beyond the vertex 47, the width of the fracture beyond the immobile mass does not appreciably increase. It is well established in linear elastic rock mechanics that the fracture width is determined by the build up of net pressure within the fracture to compress the adjacent rock. The behavior of the DSF is complex because it has two components that may act to apply force at the vertex 47 independently, one liquid and the other solid. Without being bound by theory, it is presently believed that the width of the fracture at the vertex 47 will be determined by the pressure applied by the mobile component. If only the liquid is mobile, the width of the fracture at the vertex 47 will cease to grow as soon as its width is adequate to receive liquid flow, which is quite narrow. If the solids are mobile and able to apply force at the vertex 47 (i.e., beyond the formed immobile mass 48 at the vertex itself), the width at the fracture vortex 47 will grow until it is adequate to accept the solids. Finite element modeling shows the increase in FCS that will be achieved at the wellbore 49 for a given width W1 is highly dependent on the width at the vertex 47. If the solids can be made to be immobile so they cannot apply force to widen the fracture at vertex 47, a large increase in FCS can be achieved at 49. The DSF is designed with high fluid loss, which reflects the ability of the fluid to travel through the solids without significant drag or resistance. If the fluid does not apply appreciable force to the solids, the solids are prevented from applying sufficient force to widen the fracture at vertex $L_{IM}$ 47. It has also been shown through modeling that very small widths at the vertex 47 do not greatly reduce the stress at the wellbore 49. The stress state around the wellbore is largely a product of the width and taper of the fracture across the region $L_{IM}$, which is not greatly changed if the width at vertex 47 is less than a few microns. The ability of filtrate to press against the vertex 47 and/or the filtrate region $L_F$ to create a few microns of width, does not significantly reduce the increase stress at the wellbore, or the achievable integrity. Accordingly, implementations of the present techniques seek to immobilize the solids quickly and to prevent mobile solids from pressing against the tip, however it is not necessary to prevent the penetration of filtrate to the tip.

As drilling progresses, if the borehole pressure exceeds the formation integrity, a fracture will be initiated at the wall of the wellbore. When drilling in accordance with the present DSF methods, the Drill and Stress Fluid (DSF) enters the fracture and it rapidly loses its carrier fluid into the permeable fracture face causing the solids contained in the DSF to become immobile. The carrier fluid (filtrate) may also be lost by flow through the solids to the tip. The particles in the drilling fluid that form the immobile mass are concentrated within the fracture as the carrier fluid leaks off. The particles in the immobile mass cease to transmit pressure to the tip of the fracture. As the immobile mass begins to support wellbore pressure, the fracture is widened by the increasing back pressure against the solids (though some amount of filtrate may continue to travel through the growing immobile mass). The immobile mass will grow in both thickness and in width as the fracture widens to support the borehole pressure. If the immobile mass is effective, the blockage will support the full borehole pressure and the width of the fracture (and associated mobile mass) will grow until its closing stress also equals the pressure. The fracture will become packed with solids and the closing stress will be trapped permanently. Since the new closing stress will equal the borehole pressure, fluid losses will be controlled. Since the fracture opening pressure also equals closing stress, the fluid pressure while drilling with the DSF method essentially creates the stress required to support the pressure.

Referring to FIG. 4b, the fracture 42 becomes packed from the end of length $L_{IM}$ back to the fracture mouth 49 with substantially dehydrated solids that in effect "trap" the increased closing stress. The stress holds the solids in place after pressure drops in the wellbore. If the future borehole pressures do not exceed this stress, significant lost returns will not occur. Borehole pressure above the stress should be avoided to minimize the risk that the fracture may widen further which could cause the solids in the fracture to be bypassed or flushed down the fracture. In the end, sufficient fracture width must be built and maintained by the immobile mass (i.e., sufficient closing stress achieved through gradual pressure build-up) so that the closing stress exceeds the borehole pressure that will be created by subsequent drilling operations, which may be greater than the closing stress required to drill the formation interval or zone being treated. The controlled pressure build-up may be accomplished by gradually increasing the borehole pressure while monitoring the impact on the immobilized fracture. Additionally or alternatively, the pressure may be built-up through one or more squeezes similar to hesitation squeezes. For example, the well may be shut in and pressure can be applied with rig pumps to further widen the fracture with the DSF in the wellbore adjacent the fracture to be widened. The fracture can then be controllably filled with solids so that the fracture width and stress are increased to meet the needs of the planned or anticipated drilling operations.

There are four design principles in the DSF method that, collectively or individually, create the desired beneficial results: (1) enhance the rate of fluid loss to accelerate development of an immobile mass; (2) select particles with a size distribution, shape, and/or internal permeability to achieve low packing efficiency, internal fluid friction, and/or high fluid loss; (3) maximize the concentration of LCM in the carrier fluid to reduce the leakoff required to form an immobile mass; and (4) select particle sizes of the solids to increase resistance to particle movement down the fracture so that the filtrate fluid is more likely to flow through the immobile mass to the fracture tip. One distinguishing feature of the DSF process is that it achieves fracture tip isolation through the development of an "immobile mass" of solids, rather than through blockage with particles of a specific size. The DSF process achieves rapid development of the immobile mass and mitigates stuck pipe risks that are often intrinsic to operations with high fluid loss systems. The immobile mass forms rapidly due to the high spurt loss of the drilling fluids. Moreover, the DSF drilling fluids according to the present disclosure have been observed to form filter cakes having very low shear strength (i.e., low effective grain stress) reducing the risk of stuck pipe.

The DSF method builds stress continuously and creates an immobile mass within the fracture so rapidly that it does not allow significant loss of whole mud to occur. The process of building integrity continuously in newly exposed rock requires unique design considerations, which are discussed below. FIGS. 2a and 2b may be helpful in providing an overview of these design considerations. As discussed above in connection with FIGS. 2a and 2b, the DSF method includes the steps of preparing a drilling fluid, drilling the borehole with the drilling fluid, and forming an immobile mass in a fracture formed while drilling, the immobile mass being formed of particles from the drilling fluid. Additional steps that may be described in connection with these steps may be implemented as appropriate but are not required for the practice of the present invention.

Figure 1:
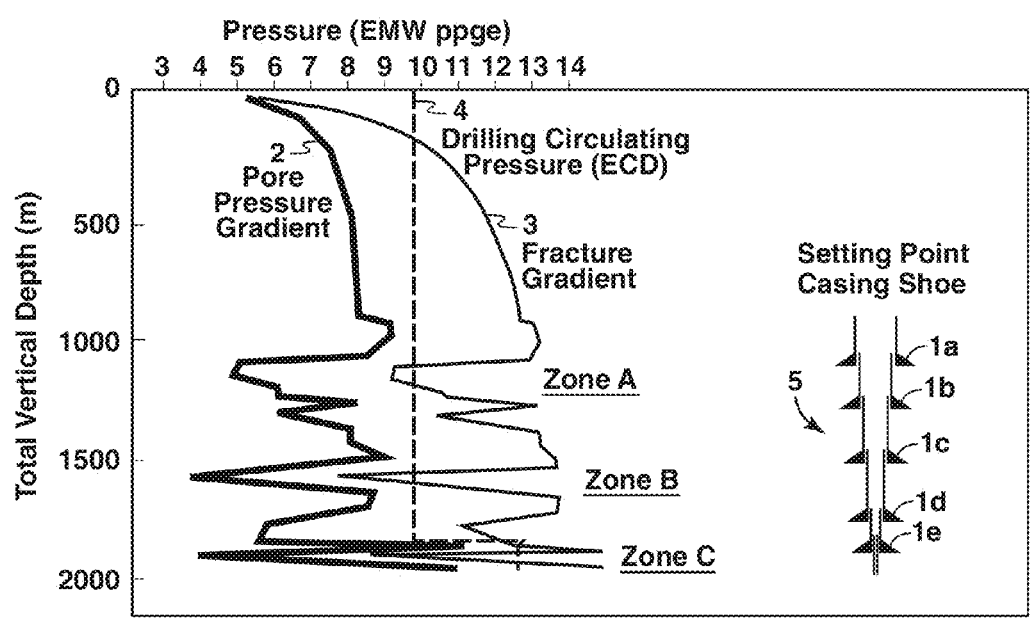
FIG. 1 is a graph of depth in meters versus expected pressures and fracture gradients during drilling of a well, along with planned depths of casing strings in the well.

FIG. 2b illustrates several preparatory steps that may be used in connection with the DSF method 110. For example, the initial fracture gradient of a formation interval may be determined (such as by measurement, modeling, estimation, etc.) at box 10 and a desired fracture gradient is selected at box 11. The desired fracture gradient may be selected based on any variety of factors, including the fracture gradients of other intervals in the wellbore. Referring to FIG. 1 for example, to drill Zone A the fracture gradient must be increased from about 8 ppge (pounds per gallon equivalent), the estimated fracture gradient in this zone having reduced pore pressure, to about 9.8 ppge, the equivalent circulating density. Therefore, the increase in wellbore integrity needed is 1.8 ppge. To compress the adjacent rock and achieve the increase in integrity, it is necessary to build pressure within the fracture that would form in Zone A of FIG. 1.

Having established the initial fracture gradient and the desired fracture gradient, it is then possible to predict, or otherwise determine, the width of a facture that would produce the desired fracture gradient. For example, the target fracture width may be referred to as a "design width". The design width may be defined as the width of the fracture at the borehole based on calculation or experience that will achieve the desired or selected increase in formation stress. To calculate the target fracture width, a numerical model based on rock mechanics principles may be used. Such models are available in industry and are familiar to persons skilled in the art of numerical modeling. Rock properties of the selected zone and other physical properties of the zone used in the model may be estimated from logs of the zone and other data, using well known methods. If fracture width is to be calculated, various values of fracture length may be assumed and the fracture widths calculated that will result from the anticipated borehole pressure. For example, lengths between 0.5 and 10 ft may be assumed. Design width should be selected so that the treatment will succeed over a reasonable range of actual lengths because there will always be uncertainty as to how rapidly the immobile mass will develop. Alternatively, the design width may be estimated from prior experience of drilling the selected zone under similar conditions or from experience in placing treatment materials in other wells. The steps leading up to and including the determination of a design width may be implemented in DSF methods 110, or may be omitted as illustrated in FIG. 2a. When included, the determined design width may inform the selection of particulate material for the DSF fluids.

For example, particulate treatment material to form the immobile mass may be selected based at least in part on a determined fracture width. In some implementations, the particulate treatment materials may be selected to provide a particle size distribution having at least fifty percent of the particles of a size smaller than the design width of the fracture. Due to the variety of particle configurations that may be included in the DSF and the changes to a particle's shape that are possible in the course of the present methods, references to a particle's size herein are references to the particle's effective size at the fracture. Accordingly, a particle having a size smaller than the width of a fracture is a particle that under the conditions of the fracture location (e.g., pressure, temperature, etc.) will fit within the fracture. In contrast to prior methods that sought to plug or block a fracture opening with large particles, the present methods form an immobile mass within the fracture from particles smaller than the determined fracture width.

Whether the determined fracture width is calculated or otherwise considered in the present methods, the drilling fluid may include at least about ten percent by volume particulate treatment material. Preferably, at least about twenty percent by volume of the fluid is particulate treatment material that will allow high spurt loss from the fracture. Total particulate materials in the drilling fluids, considering drilling solids and treatment materials, may preferably be about thirty percent by volume. While particles smaller than the desired fracture width are preferred for formation of the immobile mass, some amount of particles larger than the desired fracture width may be included. For example, larger particles may be included in the DSF to accommodate for uncertainty in fracture width determinations. Additionally or alternatively, in implementations where the target fracture width is not determined, a range of particle sizes may be included to accommodate a range of potentially desirable fracture widths. One exemplary DSF may comprise 20 percent by volume particulate treatment material in a carrier fluid, at least 50% of which is in the particle size range less than the width $W_1$ (see FIG. 4b) of the fracture (whether determined or not). In another example, the volume concentration of the particulate material may be 22 percent with about 90% of the material being smaller than the calculated or estimated fracture width. Any variety of combinations of concentrations may be used provided that the particulate materials in the DSF fluids allow for a high spurt loss. Exemplary DSF fluids include at least about ten percent by volume particulate treatment material and/or include solids at least fifty percent of which have a size less than the determined width of the fracture.

In selecting solids to form the immobile mass during drilling a zone having low fracture gradient (e.g., Zone A of FIG. 1), particulate material may be selected with a specific gravity such that the total solids content lies between 20 and 45% by volume when mixed to the desired density. For example, light weight DSF fluids typically contain nut hulls (S.G.=1.2), mid range density fluids contain calcium carbonate and frac sand (S.G.=2.65) and high density fluids contain coarse barite (S.G.=4.2). The strength or elasticity of materials is not relevant to the method. Solids content is preferably maximized to reduce the volume of fluid that must be lost to achieve the immobile mass. Lower concentrations of solids may be effective in higher permeability zones having more drawdown pressure, where fluid loss rate may be greater. Lower permeability or less drawdown pressure may benefit from use of higher concentrations of particulate material, so that less leakoff is required to achieve the immobile mass.

Figure 5:
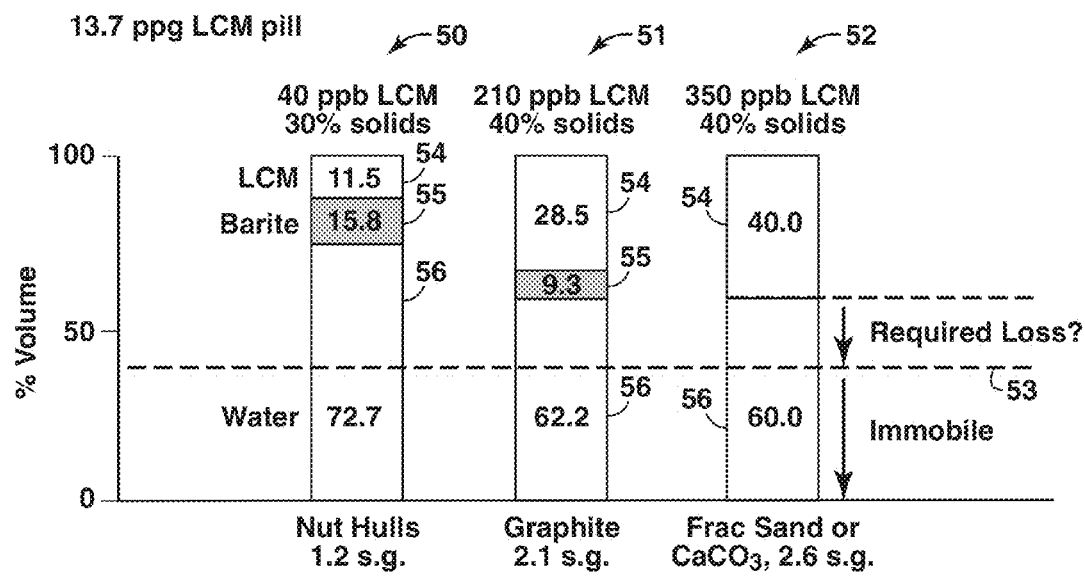
FIG. 5 is a graph illustrating the relationship between percent solids and density of solids.

The concentration of solids used is preferably the maximum that can be circulated and suspended reliably. There is no required threshold. The higher the starting solids concentration, the less fluid loss required to develop an immobile mass. FIG. 5 shows that relatively small changes in the starting solids concentration may have a large effect on the amount of fluid loss needed. FIG. 5 is a bar graph showing bars 50, 51, and 52 which illustrate spurt loss from three LCMs: nut hulls, graphite, and frac sand. All examples are for a fluid mixed to have a density of 13.7 ppg with differing amounts of LCM 54 and barite 55. In the first bar graph 50, the LCM is nut hulls, having a specific gravity of 1.2. In the second bar graph 51, the LCM is graphite, having a specific gravity of 2.1. The first two examples show fluid designs with about 30% total solids (72.7% water) and about 40% total solids (62.2% water), respectively. While the fluid with lower solids concentration contains only 10.5% more water, it may be necessary for it to lose 100% more volume to develop into an immobile mass. This is because it is not necessary to lose all of the water in order for the solids to become immobile; it is only necessary to drop the water content to a critical threshold where the solids begin to exhibit immobility. In FIG. 5 a water content of 39% is illustrated (shown as dashed line 53) as the critical threshold. The closer the initial fluid content starts to this threshold, the less volume loss is required. Therefore, in this example, graphite is a better LCM than nut hulls. However, this preference may vary from formation to formation depending on factors such as permeability of the formation, etc.

The second and third bars 51 and 52 in FIG. 5 show that the selection of LCM density is also critical because this determines the maximum concentration of LCM that may be placed within a fluid and yet retain pumpability. In this case, the maximum allowed solids content was assumed to be 40% by volume and the design pill density was 13.7 ppg. If a LCM of moderate density (2.1 specific gravity) is used, it is only possible for 28.5% of the volume to be composed of this material, and the remainder must be high density barite, or the total solids content will exceed the 40% design threshold. If a higher density material is used such as calcium carbonate (2.6 s.g.) it is possible for the entire 40% solids content to be LCM. In this manner, LCM is being used as both a lost circulation material and weighting agent.

Generally speaking, the solids content is maximized by using low density LCM for low density drilling fluids because the use of higher density LCM such as calcium carbonate would not allow much product to be added before the LCM itself caused the fluid density to rise beyond the design value. Conversely, the concentration of LCM-sized materials is maximized in higher density fluids by using high density LCM. This design consideration reflects the goal of maximizing the solids content to reduce the fluid loss required to develop an immobile mass.

While the selection of the particulate material concentrations and the selection of the particle size distribution may be part of the present methods, a design consideration underlying each of these selections is that the drilling fluid is prepared to have a high API PPA spurt loss, which in some implementations is preferably greater than 10 ml across a porous medium with a permeability, differential pressure, and temperature representative of the loss zone. More preferably, the spurt loss may be greater than 15 ml. The spurt loss should be measured according to procedures set out in API Recommended Practice 13B-1 for water base fluids (Third Ed., December 2003) or API Recommended Practice 13B-2 for oil base fluids (Fourth Ed., May 2005). The spurt loss is a measure of the rate of filtrate loss before a filter cake starts to become effective. Because fracture growth in the DSF process is arrested very quickly to limit its length, this method for measuring the early fluid loss behavior is believed to be the most appropriate for establishing a design criterion. Other methods have used longer term tests, such as the 30 minute High Temperature High Pressure (HTHP) fluid loss test used in the Stress Cage method (API Recommended Practice 13B-1). While the spurt and HTHP tests use different test procedures, a fluid with the DSF target spurt loss of greater than 15 ml will generally have an HTHP loss of greater than 50 ml/30 min. The contrast in values illustrates the fundamental difference in design principles between the DSF treatments and the Stress Cage treatments. The Stress Cage process requires HTHP fluid loss less than 2 ml/30 min, while the DSF process prefers a spurt loss that generally results in a HTHP fluid loss greater than 50 ml/30 min. The target API spurt loss of 10 ml has been shown to produce good results in field application, and it is a value that can be achieved with common base carrier fluids. Much higher spurt loss may be possible in higher permeability loss zones. However, an API spurt loss greater than 10 ml is an acceptable design threshold, and preferably above 15 ml.

Figure 6:
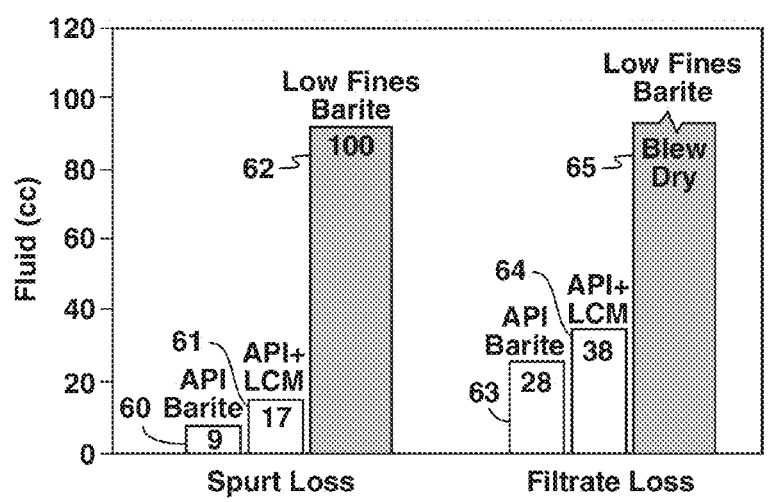
FIG. 6 is a graph of spurt loss and fluid loss from different drilling fluids.

FIG. 6 illustrates the results of tests of spurt loss and fluid loss for different drilling fluids. The first bar 60 shows the results of spurt loss tests conducted with a 12.0 ppg drilling fluid with API barite suspended in viscosified oil. In this test, the barite fines provided the blocking material that formed the filter cake. When Lost Circulation Material (LCM) was added (Bar 61), spurt loss increased because of the inclusion of coarse material in the cake. The effect of the LCM (400 micron graphite) was essentially to reduce the blocking efficiency of the barite fines. The third bar (62) shows the effect on spurt loss if the fines (particles less than 30 microns) are removed from the barite and only LCM is used. While the use of LCM to enhance fluid loss resulted in a two-fold increase in spurt loss, elimination of the barite fines caused a ten-fold increase in spurt loss. Based on this result, some implementations of the process disclosed herein preferably use a drilling fluid having solids particles larger than about 30 microns (i.e., having a majority of the fines removed). The fourth bar 63, fifth bar 64, and sixth bar 65 represent total fluid loss (cc/30 minutes) for the same materials over a longer period of time. The relative results are similar. All tests were performed in accordance with API Recommended Practice 13-B-1 or B-2.

Figure 7:
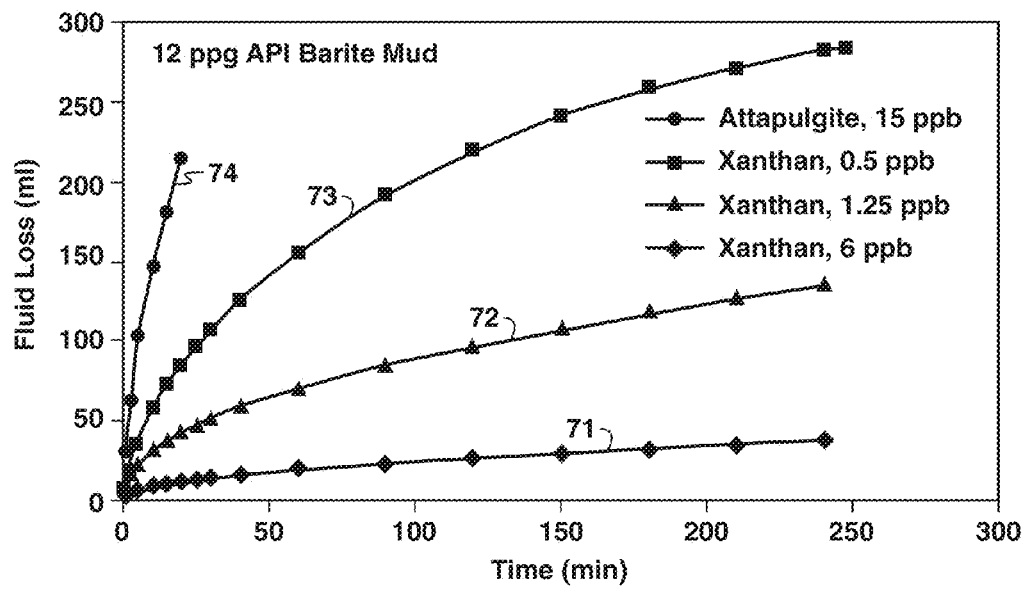
FIG. 7 is a graph of fluid loss from fluids having different suspending agents.

If barite is used in a drilling fluid to be used in the DSF method, it is preferable to use suspension agents in the fluid phase that do not greatly viscosify the water or non-aqueous fluid. FIG. 7 shows the effect of decreasing concentrations of xanthan gum (curves 71, 72 and 73 represent 6.0, 1.25 and 0.5 pounds per barrel (ppb), respectively) on fluid loss from a water base system. Xanthan gum suspends by viscosifying the water, and higher fluid phase viscosity decreases fluid loss. Curve 74 shows the effect of using 15 ppb of attapulgite as a suspension agent. Attapulgite is naturally occurring clay that does not hydrate greatly in water. Because needles of the clay interlock, it resists settling of materials through the fine suspended clay particles, but water flows through freely, so it has minimal effect on fluid loss. For this reason, attapulgite is a preferred suspension agent in the DSF method. It is particularly preferred if barite is used, which may contain fine blocking solids that pack efficiently and offer additional resistance to flow of water that has been viscosified. Other suspension agents may be used that have characteristics similar to attapulgite, specifically, the ability to suspend particles without also viscosifying the fluids.

Figure 8:
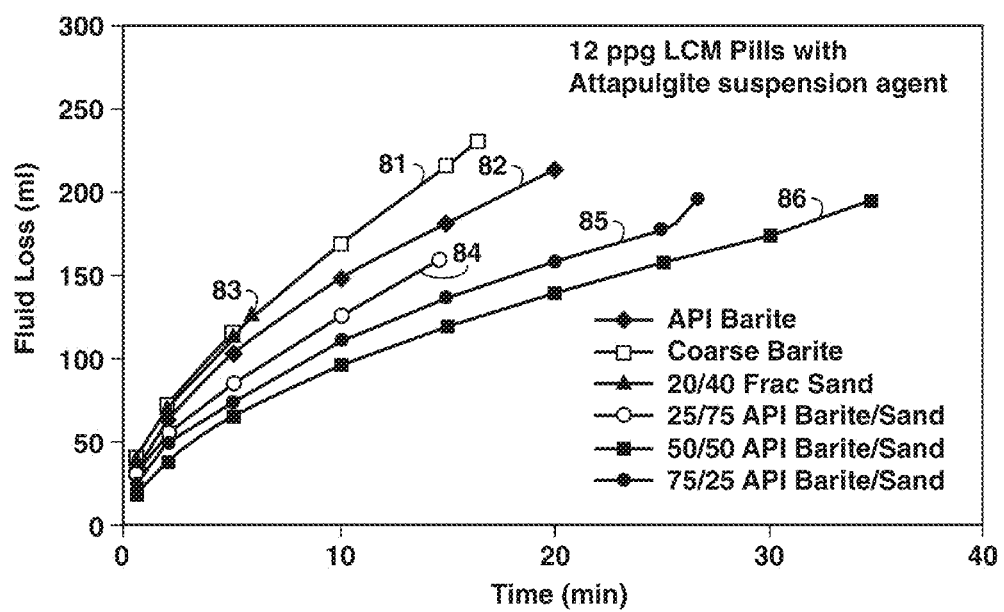
FIG. 8 is a graph of fluid loss from fluids having different particle sizes.

Fluid loss also may be enhanced in the DSF methods disclosed herein by using materials to form the immobile mass (LCM) that have a narrow particle size distribution. FIG. 8 shows the effect on fluid loss of blending materials of various sizes in a 12 pounds per gallon LCM drilling fluid having attapulgite as a suspension agent. Coarse barite (Curve 81) allows very high fluid loss. API barite (Curve 82), because of the presence of fines, allows less fluid loss. Fracture proppant sand (Curve 83) within the size range 20/40 mesh has uniform distribution and low fines content and allows very high fluid loss. Tests conducted with both API barite and coarser materials (Curves 84, 85 and 86) showed significantly lower fluid loss due to improved packing efficiency. The 50/50 mixture (Curve 86) showed the lowest fluid loss, and 25/75 or 75/25 mixtures (Curves 84 and 85) showed higher fluid loss. Based on these results, the process disclosed herein preferably uses LCM having uniform sizes or narrow size distributions and minimal API barite.

While some implementations preferably may minimize fines concentrations (e.g., particles smaller than about 30 microns) to increase the spurt loss of the immobile mass formed by the DSF fluids, other implementations may have a lower threshold or may be substantially insensitive to fines. As one example of such an implementation, DSF fluids suitable for the methods described herein may include diatomaceous earth particles. Diatomaceous earth is available in a variety of size distributions (typically having a mean size ranging from 27-40 microns), most of which are powders having particles within the range of particles that would typically reduce the spurt loss. Diatoms are microscopic skeletal remains of micron-sized animals that are irregular in shape, with internal micro-flow paths that exhibit permeability. The skeletal structure contains pathways that allow fluid to travel through the grains themselves. When these micro-flow paths are incorporated into an immobile mass (filter cake), they do not lower the spurt- or fluid loss, but enhance the transmissibility of the filter cake and thus the spurt- and filtration loss. While diatomaceous earth has been used in filtration applications and in drilling operations in the past, its use to increase the spurt loss exhibited by an immobile mass forming in a facture to prevent lost returns is counter-intuitive.

Figure 9A:
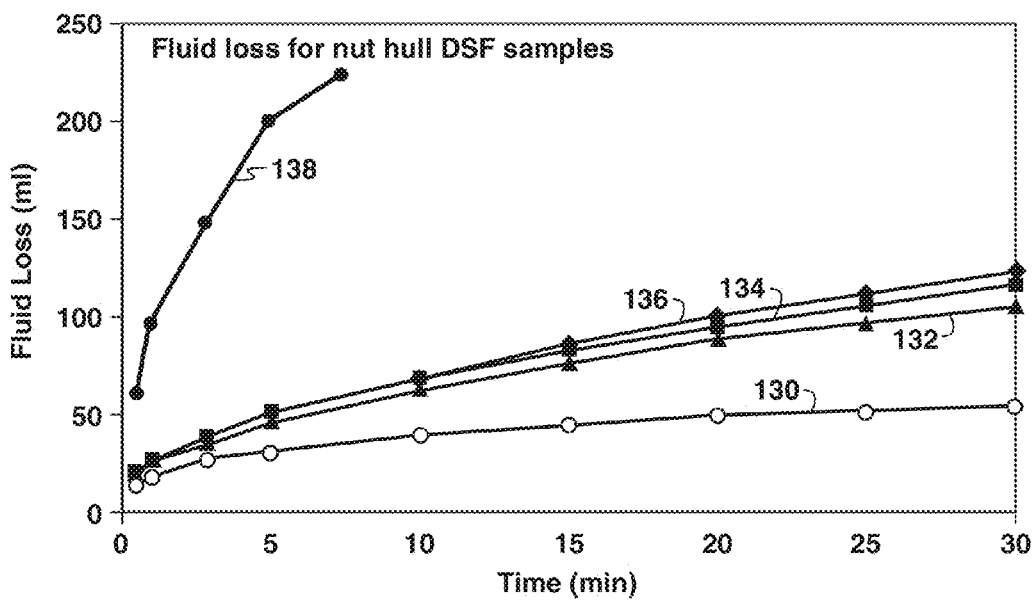
FIG. 9a is a graph of fluid loss from drilling fluids having different particle sizes and different additives.
Figure 9B:
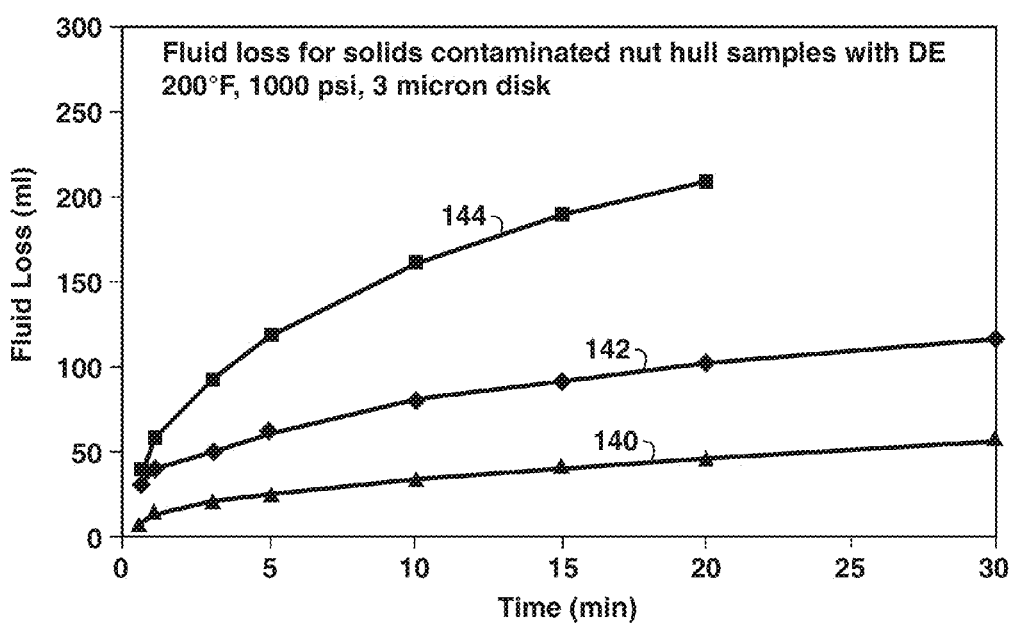
FIG. 9b is a graph of fluid loss from drilling fluids contaminated with drilling solids.

FIGS. 9a and 9b illustrate representative test data showing the impact on fluid loss of adding diatomaceous earth to a DSF fluid. In FIG. 9a, the fluid loss over time is plotted for different sample DSF fluids, each having nuthulls as the primary particulate material forming the immobile mass. In each of the samples, the total solids concentration of the DSF fluid is about thirty percent by volume. Additionally, each of the tests were conducted at about 200° F., at about 1000 psi, and in a simulated formation called an aloxite disk having a permeability of about 1 darcy. Line 130 represents the fluid loss of a DSF fluid made with nuthulls having a D50 (mean size) of 40 microns. As seen, the fluid loss of a DSF fluid having such small particles is low compared to the other samples. Line 132 represents the fluid loss of a DSF fluid made of a nuthulls having a D50 of 400 microns and also containing about four percent by volume simulated drill solids. As seen, the fluid loss for this DSF fluid simulating actual wellbore-type conditions with the inclusion of simulated drill solids is among the lowest of the fluids considered in FIG. 9a.

Continuing with reference to FIG. 9a, lines 134 and 136 represent the fluid loss over time for a DSF fluid test sample with nuthulls having a D50 of about 400 microns (line 136) and for a DSF fluid test sample with nuthulls having a particle size distribution between about 200 and about 600 microns (line 134). As discussed above and shown here, DSF fluids incorporating LCM materials having a narrower size distribution (line 136) provide a greater fluid loss than DSF fluids incorporating a range of particle sizes (line 134). Additionally, line 134 illustrates that even a range of particles of a larger size provides greater fluid loss than a DSF fluid having consistently small particles, as illustrated by line 130. FIG. 9a also illustrates the impact of adding diatomaceous earth to the DSF fluid. Line 138 plots the fluid loss over time of a DSF made of nuthulls having a D50 of about 400 microns and including about two percent by volume diatomaceous earth. To maintain the total volume percent of solids below about thirty percent, the amount of nuthulls is reduced to accommodate the diatomaceous earth replacing larger particles with smaller particles. Following the suggestions of lines 130, 132, 134, and 136, the replacement of larger particles with smaller particles would appear to reduce the fluid loss. However, as shown by line 138, DSF fluid incorporating diatomaceous earth dramatically increases the fluid loss. Line 138 of FIG. 9a stops before the test reached 10 minutes because the fluid loss was so high that it had blown dry.

The contrast between line 136 (400 micron) and line 132 (400 micron+simulated drill solids) reveals that the operation of the DSF fluid in a test condition may not be the same as operation of the same DSF fluid in field operations. The example shown here reveals that the drill solids naturally present in drilling mud in the annulus may reduce the spurt loss and the fluid loss below what can be expected from the test conditions. As it is impossible to control the size distribution of the drill solids during drilling operations, selection of LCM particle size distribution to reduce the packing efficiencies created by the drill solids is difficult if not impossible. FIG. 9b illustrates the results of three tests of DSF fluids contaminated with drill solids, these tests also being carried out at about 200° F. and 1000 psi using a simulated formation having a permeability of about a 1 darcy. Line 140 of FIG. 9b presents the results of a test using 400 micron nuthulls and about four percent by volume simulated drill solids. As can be seen, line 140 of FIG. 9b corresponds with line 132 of FIG. 9a. Lines 142 and 144 illustrate the results when diatomaceous earth was added to the same DSF fluid (i.e., 400 micron nuthulls and four percent by volume drill solids) in increasing concentrations: line 142 for a diatomaceous earth concentration of about 2 percent by volume and line 144 for a diatomaceous earth concentration of about five percent by volume. Considering the three lines plotted in FIG. 9b, it can be seen that the addition of diatomaceous earth increases the fluid loss and the spurt loss of the DSF fluid sample. Comparing FIGS. 9a and 9b, it can be seen that the tests represented by line 138 and line 144 both blew dry, while the test represented by line 144 (having 400 micron nuthulls, 4 vol % simulated drill solids, and 5 vol % diatomaceous earth) blew dry after 20 minutes rather than after about 7.5 minutes as in line 138.

FIGS. 9a and 9b illustrate that the design objective of increasing the spurt loss can be accomplished through the use of diatomaceous earth as one component in the DSF drilling fluids. Diatomaceous earth, while suitable for the present invention, is merely one example of permeable particulate material that may be included in the DSF drilling fluids. Any permeable media may be used, such as microtubes, nanotubes, compositions of microtubes, compositions of nanotubes, etc. For example, microtubes or nanotubes may be added to the DSF as distinct particles or may be clustered together, either before addition or while in the DSF, to form compositions of microtubes or nanotubes. Similarly, compositions of fibrous membranes may be added to the DSF in lieu of or in addition to diatomaceous earth or other permeable media. One exemplary implementation may utilize waste materials from other processes that require greater precision in the nanotubes or fibrous membranes. When included in the DSF, the permeable media does not have stringent dimensional requirements or design requirements as might be in place for more conventional usages of such technology. Accordingly, the scraps, waste, or rejects from the microtube manufacturing process may be added to the DSF. Similarly, fibrous membranes are often manufactured having one geometry and are trimmed to fit a particular application. The trimmings may similarly be used in DSF fluids. For example, the membrane material may be shredded, comminuted, or otherwise processed to reduce the membrane to suitably sized particles. As seen with the exemplary diatomaceous earth, suitably sized particles of permeable media may be smaller than 30 microns. Additionally or alternatively, permeable media may be selected to be comparable to the LCM material in size. For example, the nuthulls could be partially or completely replaced by permeable media having particle sizes of about 400 microns, or other suitable size determined to fit within the fracture. While waste materials may be used in the DSF, specifically designed permeable media particles may also be used in the DSF.

While FIGS. 9a and 9b provide representations of DSF drilling fluid performance having diatomaceous earth concentrations of two percent by volume and five percent by volume, these are merely examples of DSF fluids that may be prepared. Depending on the spurt loss desired for a particular drilling fluid, the other design parameters for the DSF fluids, LCM materials, and the permeability of the formation, etc., more or less permeable media may be added to the DSF. When permeable media is included, exemplary compositions may include between about one percent by volume and about thirty percent by volume or more (such as when the permeable media also provides the LCM materials).

In addition to the apparent benefit provided by the permeable media of increasing spurt loss, the inclusion of permeable media reduces the need to utilize LCM materials having a narrow particle size distribution. Moreover, the ability to use a diversity of particle sizes may allow an operator to treat a wider range of fractures with the same DSF drilling fluid. Including permeable media in the DSF drilling fluid may provide the drilling fluid with the desired spurt loss of at least 10 ml when the other particles in the drilling fluid would produce high packing efficiency. Even when efficiently packed in the fracture, the permeable media promotes high spurt loss, enabling the mobile mass to form quickly as described above.

Returning now to the overview of the DSF method 110 illustrated in FIG. 2a, once the DSF drilling fluid is prepared, the drilling fluid is circulated in the borehole while drilling the formation. While the DSF fluid is in the borehole during drilling, any fractures that form are effectively controlled by the immobile mass formed in the fracture, as described above.

Test implementations of the present DSF methods reveal that the filter cake formed during drilling with DSF fluids exhibits low shear strength, which minimizes the risk of stuck pipe and other associated concerns. Nevertheless, in some implementations of the present methods, the permeability of the formation and/or the specifics of the DSF fluid may lead an operator to be concerned about the thickness and/or the shear strength of the developing filter cake. In such implementations, the above-mentioned DST treatment 150 may accompany the DSF methods described herein. The DST treatment 150 includes monitoring the torque on the drill string and applying a remedial treatment process when the torque approaches some threshold. Additional principles of a DST treatment 150 are shown in FIG. 2b and/or are described below.

DST treatments within the scope of the present disclosure utilize a bottom hole assembly (BHA) with at least one stabilizer above the bit for the purpose of reaming the borehole. Preferably, the DST treatment utilizes two or three stabilizers, or sufficient stabilizers to prevent the drill collars from contacting the borehole wall. Stabilizers condition the cake during the Drill and Seal Treatment (DST treatment). As the stabilizers are rotated the filter cake and much of the initial solids-laden base cake are stripped away. FIG. 10a shows a thick filter cake formed by drill solids 92, barite 94 and filtration control material (fine particles) 96. Each time the base cake is re-exposed by a rotating blade, an opportunity exists for a particle from the mud to be captured that more closely fits the openings in the cake. Particles that fit closely are held more strongly by the differential pressure across the cake while larger particles are more likely to be sheared away by the stabilizer or fluid flowing by. Each rotation of a stabilizer blade allows this "fine particle selection" process to be repeated. Eventually the face of the cake is blocked down to the 1 to 5 micron range where filtration control material may be captured effectively, as shown in FIG. 10b. At this point the cake will be thin because it is scraped to the diameter of the stabilizer, and it remains relatively thin because it is efficiently sealed by filtration control material 96.

The DST treatment methods utilize a DST pill that is pumped into the wellbore during the treatment. A suitable DST pill may have an API HTHP fluid loss of less than 6 ml/30 minutes (as measured by the API tests cited above) at the estimated bottom hole temperature. The pill preferably contains a minimum of 10 ppb of "blocking solids," which are preferably selected to have an average particle size diameter (D50) estimated to be equal to estimated pore throat size divided by 2.5. This concentration of blocking solids should be used regardless of whether it is required to achieve the API HTHP threshold of 6 ml/30 minutes to ensure the DST pill is effective in the given permeability. The pill is usually 30-50 bbls in size. As the DST treatments are applied when the filter cake in the wellbore is overly thick or otherwise of poor quality, the DST pill is designed to be very efficient in replacing the poor quality cake as it is stripped to form a very high quality filter cake, as shown in FIG. 10b. The process seeks to replace this poor quality (thick and/or leaky) cake with a thin, low permeability cake that does not re-grow in thickness. The morphology of the replacement cake is the same as that which occurs with any filter cake, but the features that control fluid loss are enhanced.

The recommendation to establish a specific threshold of filtration and blocking solids in the pill design is based on the morphology of efficient cakes. Filter cakes are composed of two major characteristics (blocking control and filtration control) and each must be effective in an efficient fluid. The blocking control is provided by a layer of blocking solids that is deposited in the throats of the pores exposed in the surface of the borehole. By blocking the pore throat openings, these solids prevent other solids from entering. In the treatment design, the most likely size of the pore throats in the rock of the zone may be estimated from a correlation between permeability, porosity and throat size, such as the correlation of Pittman (E. D. Pittman, "Relationship of Porosity and Permeability to Various Parameters Derived from Mercury Injection-Capillary Pressure Curves for Sandstone," AAPG Bull. 76. No 2, p. 191, 1992). An example of the Pittman Correlation for sandstone is shown in FIG. 11. While smaller particles may eventually be effective, the ideal blocking particle may then be taken to be the diameter of the pore throat divided by 2.5, or Average Designer Particle=Pore Throat/2.5. In the example shown, for a 1-Darcy sandstone, the nominal pore throat size is calculated to be 45 microns. The 2.5 rule suggests the ideal blocking particle would be 45/2.5=18 microns.

Figure 12:
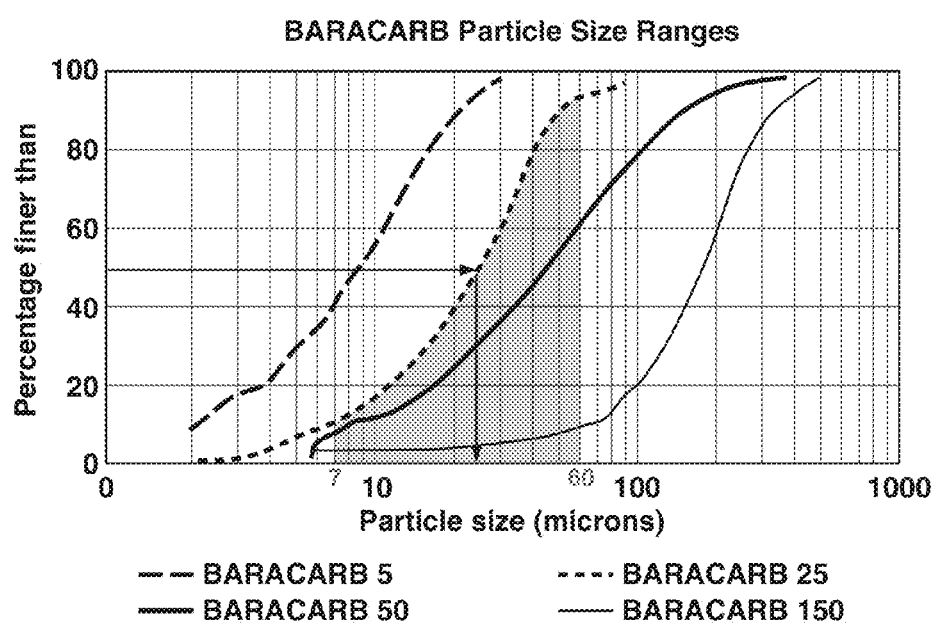
FIG. 12 is a graph of particle size distribution for commercial particles.

All commercially available products for blocking particles are manufactured with a distribution of particle sizes. Consequently, the user must determine the product with the range of sizes that spans the desired value. FIG. 12 shows size distribution curves for four products. In the example application requiring 18 micron material, the product used would be Baracarb 25, which has a D50 size of about 25 microns and 60% of its particles are larger than the required 18 microns. A water based pill may be constructed with 20-30 ppb of this product, plus sufficient barite to achieve the desired fluid density.

Blocking solids design is similar for both aqueous and non-aqueous fluids. However, the filtration material design may differ. In non-aqueous fluids, an internal water phase may serve the function of filtration control. The small water droplets are formed with surfactant that provides a high surface tension, and the entire droplet is resistant to extrusion through small spaces, such as the interstitial spaces in the filter cake or pore throats. In aqueous systems there are a variety of products, both ionic and non-ionic that may be used to reduce filtrate flow through the blocking solids and selection will depend on the specifics of the situation. Blocking and filtration control product types are not specified in the DST process and may vary depending on mud type and availability. The design objective for the DST pill is specified, which is to use a combination of products that achieve an API HTHP fluid loss of less than 6 ml/30 min.

Altogether, the pills used in Drill and Seal Treatment methods are designed to address both the blocking and filtration control required to achieve rapid deposition of a low-fluid-loss, high-quality filter cake. The pill has the following characteristics:

1) Blocking solids selected based on estimated maximum pore throat size, and used at a concentration of greater than 20 ppb.
2) Barite solids as required to achieve the desired predetermined density.
3) Filtration control material is selected to achieve an API HTHP fluid loss of <6 ml/30 min. The type of blocking solids and type of filtration control material suitable for a particular application that meets the foregoing characteristics can be selected by persons skilled in the art based on the teaching of this disclosure.

With the DST pill prepared and the torque on the drill string being monitored during drilling, the DST treatment further includes stopping the drilling operations when the monitored torque reaches a selected torque determined to indicate the need for a DST treatment. At that point, the drilling may be stopped and the DST pill circulated past the newly exposed formation at a slow rate while reciprocating and reaming the interval with the stabilizers. The interval conditioned by the stabilizers will equal the distance from the bit to the top stabilizer, plus the vertical travel while reciprocating. In some implementations, it may be desirable to condition all permeable intervals according to the DST treatment methods. Alternatively, only select intervals exhibiting undesirably high torque are treated. The DST methods may preferably use a combination of DST pill volume and slow pump rate to achieve more than 10 minutes of exposure to the pill while reaming. Once the DST pill has been applied and the stabilizers rotated and reciprocated for a suitable period of time, such as 10 minutes, the DST treatment continues by picking up above the newly conditioned interval and rotating slowly for a predetermined time, such as for about 5 minutes. The rotation may then be stopped and the bit run back to bottom. If drag is excessive while running the bit to bottom, the DST treatment process may be repeated. If not, the drilling may continue with the DSF fluids as described above.

In contrast to the LPM and stress cage methods discussed above, the DSF method disclosed herein is designed to have extremely high fluid loss, and specifically a high spurt loss. The DSF fluid is designed with particles that form an immobile mass in the fracture. In some implementations, the particles resist movement down the fracture, such as by interaction with the faces of the fracture, so that the carrier fluid outruns the solids that are dragging at the opening and along the length of the fracture. In such implementations, the size distribution of the solids is based on the estimated or calculated width of the fracture so as to create particle drag and resistance to displacement down (or through) the fracture. In other implementations, as discussed above, the determination of the width of the fracture is less important as long as the spurt loss remains high. As the carrier fluid exudes through the solids to the tip or through the exposed fracture face, the solids become immobile due to the loss of carrier fluid and form a bridge so that solids cannot continue to propagate to the tip, even though clear fluid may continue to filter through the immobile mass for a period after the immobile mass forms. For greater effectiveness, the immobile mass is developed within a few inches of the wellbore. Beyond the mass, pressure builds in the tip due to continued filtrate loss and it opens and extends when the pressure reaches the stress in the rock that holds the tip closed. However, as it extends it stays extremely narrow from the end of the immobile mass onward. The fracture then has two separate geometries, as shown in FIG. 4b. The first few inches are propped by solids, and the remainder is very narrow. It is the geometry of the short propped length that largely determines the stress increase at the wellbore, and not the length of the remainder of the fracture that has essentially no width. This conclusion was drawn from finite element modeling of stress around various fracture geometries. The field data included below show that DSF has worked in rock with permeability of less than 0.1 milliDarcy. Filtrate pressure is likely reaching and extending the tip, and yet the process is working.

Field data show that both high and low fluid loss systems can be effective. Conventional low fluid loss systems build stress by forming a bridge of specifically sized particles that create stress as they widen the fracture. However, if the bridge is ineffective and mobile, solids-laden fluid presses on the fracture tip resulting in a decline in fracture width and formation stress at the wellbore. In the high fluid loss of the DSF method, success is less dependent on a detailed knowledge of the fracture width and particle size. In the DSF method, solids movement is stopped by loss of carrier fluid, which results in the solids becoming immobile. This loss is allowed to occur freely to the permeable zones (primarily into the formation through the fracture faces), and if the formation has low permeability the DSF method is still beneficial if the loss occurs by extending the fracture tip with clear fluid. The DSF method is expected to be more versatile and require less specific formation data to achieve beneficial results.

As suggested by the foregoing discussion, the present fluids, systems, and methods can be used to control and/or limit lost returns under a variety of field conditions, including during drilling operations through formations that have varied properties. More specifically, drilling fluids within the scope of the present disclosure may be configured to provide the desired spurt loss and carrier fluid loss to create the immobile mass whether the formation is highly permeable or less permeable. As suggested at various locations above, the immobile mass will form in the fracture due to the interaction of the particles with the fracture face and with each other as the carrier fluid is lost to the formation, either through the fracture face or through the immobile mass to the tip of the fracture. In some implementations, these two modes of carrier fluid loss may be referred as fracture face leak-off and tip leak-off, respectively. In some implementations, knowing or estimating the relative modes of fluid loss may aid in designing the drilling fluid. For example, if it is known or predicted that the formation fracture faces will be very permeable, it may not be necessary to optimize particle distribution to enhance leak-off through the immobile mass to the tip. As one introductory example, the design and selection of the particles used to prepare the drilling fluids may be costly or otherwise complicate the preparation and/or selection of the proper drilling fluid. In the event that the fracture face leak-off is the primary mode of carrier fluid loss (and corresponding particle dehydration and immobilization), the selection of the particles to enhance the fluid loss to the tip through the immobile mass may be less important. Or rather, a wider range of drilling fluids may be suitable for providing the immobile mass of the present disclosure.

Some implementations of the present disclosure may include designing a drilling fluid for limiting lost returns to a fracture, such as may occur during drilling operations. More specifically, methods of designing drilling fluids suitable for use in the methods described herein are provided. In some implementations, the methods of designing suitable drilling fluids may include modeling steps utilizing models and data specific for a given well, a given formation, a given field, etc. In other implementations, the methods of designing drilling fluids may merely reference tables, graphs, or correlations developed through prior iterative modeling to present a range of likely scenarios. Moreover, in some implementations, the methods of designing a suitable drilling fluid may include modeling or otherwise predicting pressure drop and/or fluid flow in a fracture based on a variety of factors. In other implementations, the methods of designing a drilling fluid may include determining a target packing efficiency of the particles and solids to be used in the drilling fluid.

The LCM particles and other solids of the present DSF fluids may interact with the formation and with each other in a variety of manners. Moreover, the behavior of the particles may be dependent upon many factors, only some of which may be in the control of the operator. For example, the permeability of the formation in which the wellbore is being drilled will affect the ability of the DSF fluid to form an immobile mass. In the event that formation permeability varies along the length of the wellbore or along the length of the fracture, or in the event that the inherent permeability of the formation is altered by the drilling operation, the permeability of the formation may be referred to as the effective permeability of the formation at the fracture face. Similarly, the manner in which the formation fractures, such as the initial width of the fracture and/or the tortuosity of the fracture may affect the ability of the solids to aggregate, accumulate, or otherwise slow to initiate the formation of the immobile mass. Additionally or alternatively, the properties of the wellbore itself may have an impact on the ability of the solids to form an immobile mass, such as the wellbore pressure at the depth of the fracture.

The behavior of the LCM particles and other solids in the drilling fluid, and therefore their ability to form the immobile mass described above, may also depend on properties associated with the carrier fluid. For example, the viscosity of the carrier fluid may affect the ability of the carrier fluid to filter through the forming immobile mass without applying excessive force on the particles themselves. Still additionally, the ability of a drilling fluid to perform as a DSF fluid as described above may also depend in part on properties associated with the LCM particles and other solids. For example, the diameter or effective diameter (such as when the particles are not spherical) may affect the ability of the particles to drag on the fracture face as described above. Additionally or alternatively, the distribution of particle sizes may affect the ability of the carrier fluid to leak or filter through the forming immobile mass. In some implementations, the distribution of particle sizes may affect the packing efficiency of the solids in the fracture. In other implementations, the wrong distribution of particle sizes may not have suitable solids for initiating the formation of the immobile mass. Additionally or alternatively, the particle size distribution and/or the effective particle diameters may affect the inter-solids interaction in other ways, such as by altering the frictional interaction between the solids.

Due to the multitude, complexity, and inter-relationship of the factors that may affect the performance of the present DSF fluids, these inter-actions and inter-relationships would be difficult to get right through rule of thumb or trial and error, particularly in light of the costs associated with drilling a well and experiencing the lost returns the present fluids and methods are intended to avoid. However, these relationships and interactions can be modeled to help make design decisions for DSF fluids according to the present disclosure.

Figure 13:
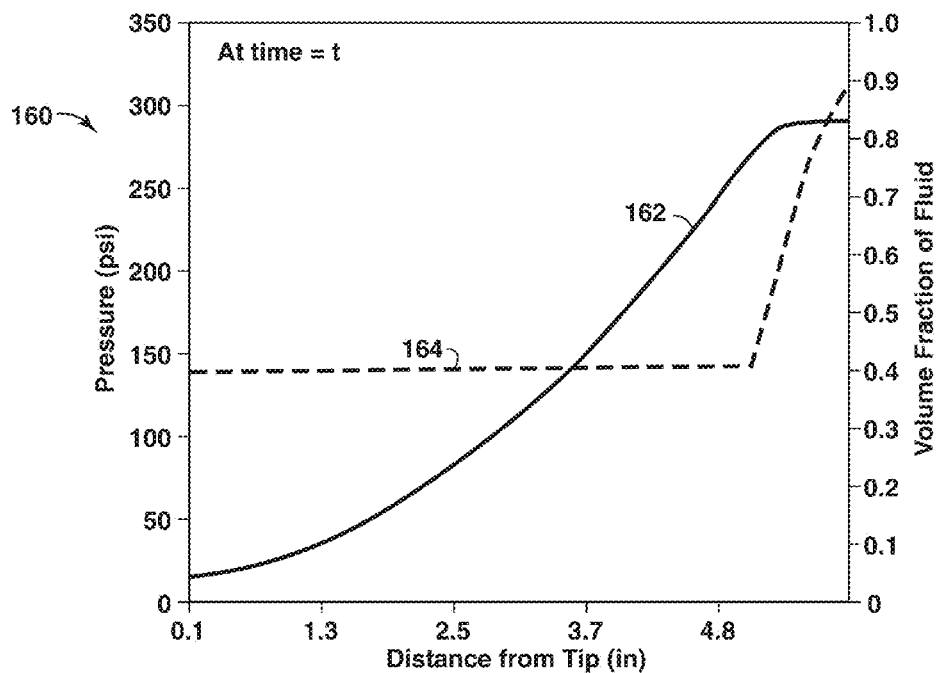
FIG. 13 is a graph of modeled pressures and fluid volume fractions in a fracture at a given time during operations with a low packing efficiency fluid.
Figure 14:
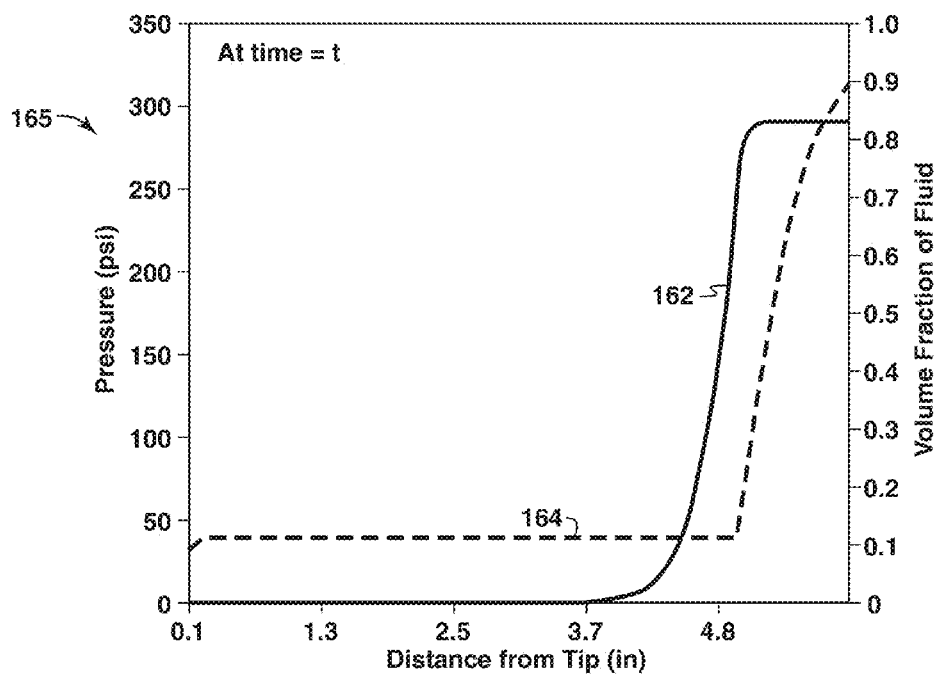
FIG. 14 is a graph of modeled pressures and fluid volume fractions in a fracture at a given time during operations with a high packing efficiency fluid.

In some implementations, the models may be configured to predict pressure drop in the fracture (i.e., across the immobile mass) based on one or more of the factors described above. For example, for a given time, a given particle diameter, packing efficiency, wellbore pressure, carrier fluid viscosity, and formation permeability, the model may be configured to predict the pressure in the fracture at various positions along the length of the fracture. FIG. 13 illustrates one exemplary plot 160 for a drilling fluid prepared with a low packing efficiency at a given time after a fracture has formed. FIG. 14 illustrates another exemplary plot 165 of pressure in a fracture along the length thereof for a higher packing efficiency drilling fluid with all other elements held constant. In both FIGS. 13 and 14, curves 162 represent the pressure in the fracture at a given time and curves 164 represent the volume fraction of fluid in the fracture at a given time. By comparison between FIGS. 13 and 14 it can be seen that the lower packing limit of FIG. 13 provides a greater pressure gradient across the immobile mass and allows a greater fluid flow through the immobile mass. The greater fluid flow through the immobile mass allows for a faster rate of solids deposition into the mass. In contrast, the model illustrates that a DSF fluid resulting in a high packing efficiency results in a high frictional resistance to fluid flow through the immobile mass, slow build-up of particles to form the immobile mass, and a correspondingly high differential stress on the immobile mass.

Use of such models to determine or predict the pressure drop patterns in a fracture during a drilling operation may allow a designer to model the use of various solids, fluids, and solids/fluid combinations to determine a designed drilling fluid composition. The designed drilling fluid composition may be as detailed as providing the precise size, shape, size distribution of the solids. Additionally or alternatively, the designed drilling fluid may include such indications as whether permeable LCM particles should be used and/or the ratio of LCM particles and weighting agents that may be used.

While drilling fluids providing a high packing efficiency and drilling fluids providing a lower packing efficiency result in different pressure profiles in the fracture, each may have suitable applications. For example, fluids resulting in a low packing efficiency may be preferred in formations having low permeability where the carrier fluid leak off to the formation is limited and the majority of the required leak off must go through the immobile mass to the tip. Such low packing efficiencies may also be preferred in situations in which a high fluid velocity through the immobile mass is desired, such as when greater volume of solids accumulation is desired. Additionally or alternatively, it may be necessary to design for high packing efficiency in situations where it is difficult to achieve leak-off of the carrier fluid. For example, non-aqueous drilling fluids tend to have intrinsically low fluid loss. Consequently, in NAF it is desirable that very little leak-off be required to achieve immobility. When packing efficiency is increased, less leak-off is required and the immobile mass develops more quickly and closer to the wellbore. This moves the stress toward the wellbore end of the fracture, and causes the stress to be supported by a shorter bridge of material near the aperture. While this may be necessary in a non-aqueous fluid due to its low fluid loss characteristics, short bridges may be more difficult to form and/or maintain the immobile mass in the fracture. The strength of the immobile mass, the ease of its formation, and its ability to maintain its strength and structure under varying wellbore operations will depend on factors such as permeability of the formation, particle sizes, solids packing efficiencies, and the other factors discussed herein. Accordingly, fluid design may be based on a determination of the most effective process for the given set of conditions, including the immediate objective of control lost returns and the other objectives common to the planning of wells related to the production of hydrocarbons.

As described above, some of the LCM particles or other solids in the drilling fluids within the scope of the present invention may be permeable, such as including diatomaceous earth or other materials, natural or man-made, that are permeable. The models represented in FIGS. 13 and 14 may be adapted to consider permeability of some or all of the solids in the drilling fluids in any suitable manner. For example, a solids permeability factor may be incorporated into the models. Additionally or alternatively, the permeability of the solids may be factored into the calculation or modeling of the solids packing efficiency. In some implementations, the use of permeable solids in the DSF fluids may result in a fluid having some of the benefits of a high packing efficiency fluid and some of the benefits of a low packing efficiency fluid.

Some methods of designing drilling fluids for use in the systems and methods of the present disclosure may include selecting a drilling fluid and modeling the combined fluid and solids flow during planned drilling operations in which a fracture is formed (or modeled to form). The drilling fluid, as discussed herein, includes a carrier fluid and solids, with the solids having an effective particle diameter. In some implementations, the modeling may be adapted to predict a pressure drop within the fracture. The model may consider factors such as the packing efficiency of the solids, the solids' effective particle diameter, the permeability of the solids, the effective matrix permeability of a formation in which the wellbore is to be drilled, one or more fluid properties of the carrier fluid, expected wellbore pressure during drilling operations, and inter-solids interaction properties. Other factors may also be considered by the model, up to and including a full-physics coupling of the interactions between the various liquids and solids in the fracture.

The modeling may predict the pressure drop in the fracture as a function of time following the formation of the fracture and/or as a function of the distance from the tip of the fracture. The models may be further configured to predict or determine the volume fraction of fluids in the fracture as a function of time and/or distance from the tip. In some implementations, the modeling may be further configured to characterize the fluid loss resulting in pressure drop as a proportion of fluid lost through fracture face leak-off or through tip leak-off.

The steps of selecting a drilling fluid composition and modeling the flow of the drilling fluid is repeated while varying one or more aspects of the drilling fluid with each repetition. The drilling fluid composition is iteratively modeled until a target fracture pressure drop is predicted by the modeling, at which point the designed drilling fluid composition is determined. In some implementations, the repetitive selection of drilling fluid compositions may be informed by the results of the prior modeling steps. For example, the prior modeling may suggest that a higher or lower packing efficiency would be more likely to result in the target pressure drop. Additionally or alternatively, the prior modeling may suggest that a different particle size distribution and/or a different permeability of the solids would be preferred. Other aspects of the drilling fluid composition may be varied with each iteration. Still additionally or alternatively, the drilling fluid composition may be selected for each additional repetition with reference to the prior predicted pressure drops and with references to the characterization of the fluid loss modes.

In some implementations of the present methods, drilling fluids may be designed based at least in part on a target packing efficiency. The target packing efficiency may be determined based at least in part on one or more factors selected from: 1) the effective permeability of a formation in which drilling operations are conducted, 2) the effective particle diameter of the solids, 3) the design fracture width of the fracture, 4) the permeability of the solids, 5) the one or more fluid properties of the carrier fluid, 6) the expected wellbore pressure during drilling operations, and 7) the inter-solids interaction properties. The target packing efficiency may be determined through modeling of a particular well site or of a particular formation. Additionally or alternatively, the target packing efficiency may be determined by reference to tables, charts, graphs, correlations, response surfaces or other means available for summarizing or otherwise making more readily available the types of data regularly available only through modeling. For example, a collection of pressure drop curves may be prepared considering a variety of possible field conditions. For a given drilling fluid design for a given well, the collection could be referenced to aid in the determination of a target packing efficiency.

Once a target packing efficiency is determined, the drilling fluid design may continue by identifying one or more characteristics of solids to be carried by the carrier fluid to provide the target packing efficiency. For example, the identified characteristics may include: 1) the distribution of particle sizes, 2) the effective particle diameter, 3) the volume fraction of solids in the carrier fluid, 4) the permeability of the solids, and 5) the surface properties of the solids. In some implementations, the carrier fluid may also be considered in conjunction with the solids for designing a drilling fluid having a target packing efficiency.

The methods of designing a drilling fluid may be utilized in conjunction with methods for drilling a borehole. As suggested throughout this disclosure, the drilling fluids of the present disclosure are for use in drilling boreholes in subterranean formations, particularly in circumstances where a fracture is expected to form during drilling operations. In some implementations of the present methods for designing a drilling fluid, the formation into which the borehole will be drilled may be identified along with its accompanying formation properties. One or more aspects of the formation property may be considered by the present design methods to determine the target packing efficiency.

Additionally, the present design methods may continue to include the step of providing a drilling fluid comprising carrier fluid and particles, wherein the drilling fluid has one or more of the characteristics identified in the design steps. Accordingly, the borehole may be drilled into the formation using the designed and provided drilling fluid. In some implementations, the present methods may further include producing hydrocarbons from the borehole.

Figure 15:
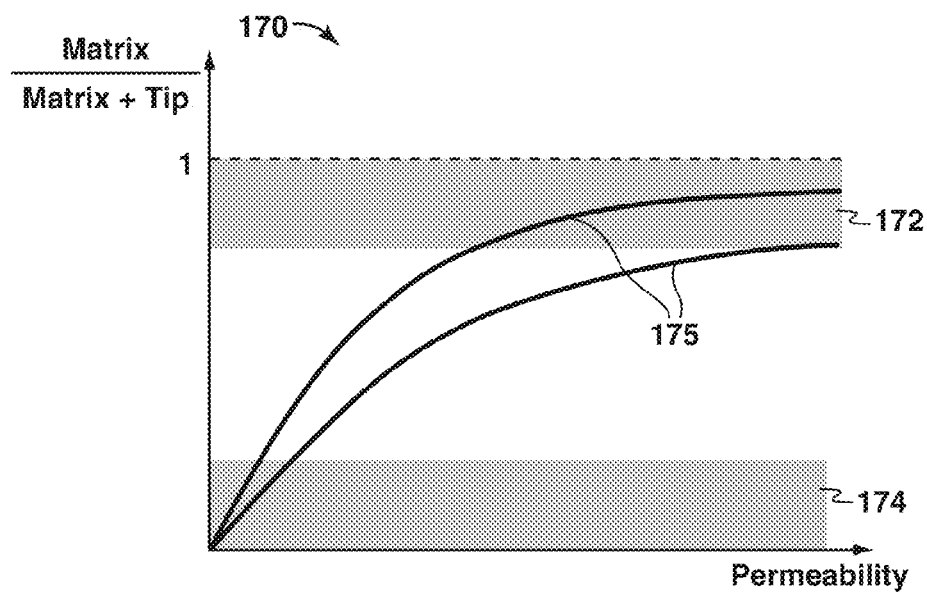
FIG. 15 illustrates fluid loss mode characterizations for two different drilling fluid compositions for a range of permeabilities.

As suggested in the above discussion, some implementations of the methods and systems disclosed herein may include designing the drilling fluid based at least in part of the mode of fluid loss expected as the immobile mass is being formed. For example, the design of the fluid may vary depending on whether the dominant fluid loss mode is through fracture face leak-off or through tip leak-off. The models described above, based on the interactions between the solids, the carrier fluid, and the formation, may be used to characterize the fluid loss for a selected proposed drilling fluid. The models may consider any of the variety of factors that may influence the interactions in the fracture, such as those described above. Such modeling may be used to prepare data regarding the relationship between the modes of fluid loss, such as fracture face leak-off over the total fluid loss, and a particular permeability of the formation for a given proposed drilling fluid. The method may be repeated using the same proposed drilling fluid and varying the permeability of the formation to generate a curve illustrating the modes of fluid loss for a given drilling fluid in a variety of formation permeabilities, such as illustrated by any one of the curves 175 shown in FIG. 15. The plot 170 in FIG. 15 illustrates the fraction of the carrier fluid lost through fracture face leak-off, as a percentage of the total fluid lost, plotted along the vertical axis, against the permeability of the formation plotted against the horizontal axis and increasing to the right. In some implementations, the method may be repeated at least twice to provide a comparison of the performance under differing formation conditions.

The steps of selecting a proposed drilling fluid, modeling the combined fluid and solids flow, and varying the effective matrix permeability may be repeated considering at least two proposed drilling fluids. As illustrated in FIG. 15, the plot 170 of multiple drilling fluid curves 175 allows a user to quickly determine the mode of fluid loss for multiple proposed drilling fluids for a range of permeabilities. Moreover, an even greater number of drilling fluids can be designed in practice than were modeled by way of interpolation between and along the curves prepared through these steps. The drilling fluid for a particular application may then be designed by identifying a formation into which a borehole will be drilled. Upon identifying the formation and determining the formation permeability, the fluid loss characterization data may be consulted to determine the drilling fluid properties that are best suited for the particular drilling operation. Accordingly, drilling carrier fluids and drilling solids may be selected for use in drilling operations.

In some implementations, the fluid loss mode data may be presented in a visual graphic such as shown in FIG. 15. However, it should be understood that the data may be presented in any suitable manner for reference by a drilling fluid designer.

While the methods of designing a drilling fluid may be implemented to identify particular carrier fluid and solid properties and combinations suitable for a particular operation, other implementations may be configured to provide aids to the fluid design process. For example, the curves of FIG. 15 may be determined or predicted based on particle diameter, packing efficiency, width of fracture, and formation permeability, without consideration for particle permeability, frictional interactions, viscosity of the carrier fluid, etc. While such a determination or characterization may not completely define the drilling fluid to be used, it may still aid in characterizing the mode of fluid loss. Knowing the mode of fluid loss, such as illustrated in the graph of FIG. 15 may allow a designer to determine the degree to which the drilling fluids need to be designed. For example, if the characterization determines that a large portion of the fluid loss is through the fracture face, the careful design of the drilling solids to form the immobile mass will not be as important. For example, the inclusion of permeable solids may not be required. However, if the characterization illustrates that the majority of the fluid loss is through the immobile mass to the tip, the designer will know that the carrier fluid and the solids should be carefully designed and selected to ensure sufficiently high permeability through the immobile mass. For example, the designer may specify certain levels of solids permeability and/or certain particle size distributions. As described above, increasing the solids permeability and/or narrowing the particle size distribution will improve the permeability of the immobile mass.

FIG. 15 includes an upper shaded region 172 and a lower shaded region 174, which schematically represent design thresholds. For example, if the drilling fluid loss characterization curve 175 extends into the upper shaded region 172 for a selected drilling fluid and formation permeability, the designer may know that the proposed drilling fluid will achieve an immobile mass easily and therefore will not need the assistance of careful particle size distributions and/or permeable solids. Similarly, if a selected combination of formation permeability and proposed drilling fluid reveals that the fluid loss characterization curve is still in the lower shaded region 174, the designer may know that the immobile mass will be more difficult to form and/or maintain. The graphical plot 170 is conducive to visual representations such as the shaded regions to further assist the designer. Other forms of presenting the fluid loss characterization may be more conducive to other forms of presenting these design thresholds. The design thresholds may be established through modeling and refined through field experience.

While the design thresholds may be helpful in some implementations of the present fluid design methods, they may not be developed and/or referenced in every implementation. For example, and as discussed above, the design of a drilling fluid may consider various factors in addition to the relative ease of forming the immobile mass described herein. In some implementations, the designer may prefer a characterization that allows the designer greater judgment and discretion in selecting the carrier fluid and drilling solids. For example, a particular field operation may have a limited choice of carrier fluids and drilling solids that the designer can choose from to provide the properties suggested by the characterizations. Additionally or alternatively, the characterizations and other modeling described herein may be based on less than all of the relevant factors or parameters for computational and/or modeling reasons.

EXAMPLE 1

Figure 16:
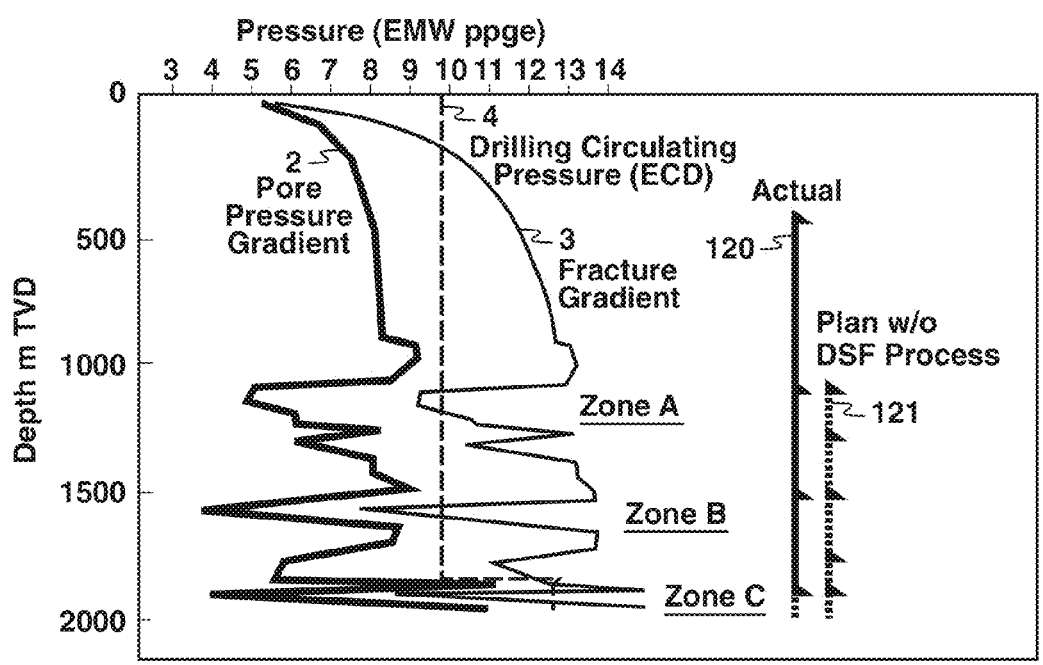
FIG. 16 is a graph of expected pressures and fracture gradients during drilling of a well, along with planned and actual depths of casing strings in the well.

The method disclosed herein has been tested in eight wells (four high- and four low-permeability wells). FIG. 16 shows plots of key data from one of the high-permeability wells, which is representative of four of the eight test wells. These four wells demonstrate performance in high permeability.

(The same data are shown in FIG. 1.) Three severely depleted reservoirs were penetrated, designated by Zone A, Zone B and Zone C. Permeability ranged from 500-1000 milliDarcy and overbalance was in excess of 2000 psi. The circulating pressure greatly exceeded the estimated integrity of the three formations (zones). Throughout the four wells, one minor loss event was observed, but the well stood full with static mud weight 1 ppg above integrity and drilling continued. The plan for a casing program for the well (shown at right of FIG. 16 and labeled 121 "Plan w/o DSF Process") was to set casing just above and below each of these zones. However, using the method disclosed herein, the actual casing program (shown to the left of the plan in FIG. 16 and labeled 120 "Actual") avoided two of the strings of casing. In the most severe test, the process disclosed herein built stress continuously without significant fluid losses with circulating pressures over 2.5 ppg above initial integrity of the zone being drilled. Drill and Seal Treatments were utilized and high torque, drag and pipe sticking were not observed.

EXAMPLE 2

An interval of approximately 700 ft of depleted low-permeability sandstone (having permeability of less than 0.1 milliDarcy) was drilled in four wells. Borehole pressure exceeded integrity by 1-2 ppg. A minor loss event occurred briefly during drilling each of the first two wells, but the borehole stood full and circulation was reestablished immediately. Small adjustments were made and no loss occurred in the third or fourth wells. In each case the DSF maintained borehole pressure more than 1 ppg above the depleted fracture gradient. Over 95% of the depleted interval was drilled with no losses.

Figure 17:
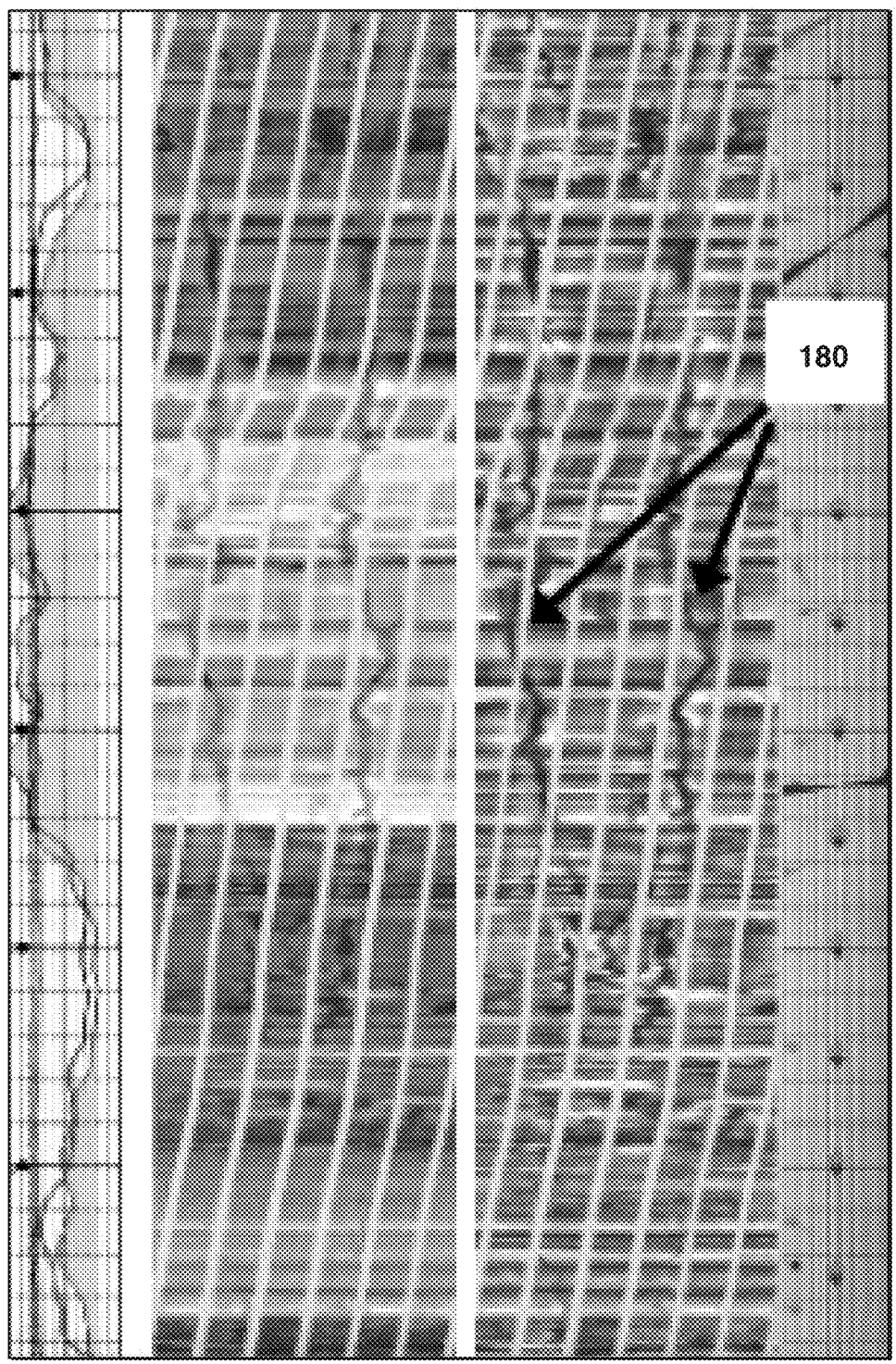
FIG. 17 is a fracture identification log showing a fracture formed in a formation while drilling through the formation employing the methods disclosed herein.

These four test wells were drilled through very low permeability strata where it was believed that conditions were least favorable for the DSF method to succeed, but losses were minimal. To show that a fracture was created and maintained to increase stress in the low permeability zones, a fracture identification log was run on two of the wells drilled. FIG. 17 shows a section of log from one. Fracture 180 extends through the low permeability strata and demonstrates that the integrity of the strata was being exceeded during drilling. Of the 700 ft of gross interval, 350 ft were fractured. Since no significant fluid losses were detected at the surface, fracture growth was arrested before losses became significant.

Although the present disclosure has been described in detail, it should be understood that various changes, substitutions and alterations can be made thereto without departing from the scope and spirit of the invention as defined by the appended claims.

We claim:

1. A method for drilling a borehole into a subterranean formation, the method comprising:
    determining a width of a fracture in a wellbore wall of a wellbore in a formation;
    preparing a drilling fluid, the drilling fluid comprising an initial solids content of at least about 10 percent by volume in a carrier fluid, wherein the solids content and the carrier fluid are selected such that carrier fluid spurt loss is enhanced concentrating the solids content of the drilling fluid into an immobile mass in the fracture; wherein the solids have a size distribution selected based at least in part on the determined width of the fracture; and wherein at least 50 percent of the solids (1) have a size less than the determined width of the fracture and (2) are permeable to the carrier fluid; and
    drilling the wellbore into the formation using the drilling fluid.

2. The method of claim 1 wherein the determined fracture width is an estimated width of a fracture that would form during planned drilling operations.

3. The method of claim 1 wherein at least some of the solids have a size selected to fit within the fracture and to interact with at least one fracture faces to resist movement within the fracture.

4. The method of claim 1 wherein the immobile mass is formed in the fracture without interrupting drilling of the wellbore.

5. The method of claim 1 wherein pressure acting against the immobile mass widens the fracture on a wellbore side of the immobile mass increasing the formation's fracture closure stress adjacent to the fracture.

6. The method of claim 5 wherein the fracture closure stress is increased without interrupting drilling of the wellbore.

7. A method for drilling a borehole into a subterranean formation, said formation having a hydraulic fracture, comprising:
    (a) preparing a drilling fluid having an API carrier fluid spurt loss greater than about 10 ml and comprising at least 10 percent by volume particulate treatment material, with at least 50 percent of the particulate matter (1) having a size less than a design width of the hydraulic fracture and (2) are permeable to the carrier fluid in the drilling fluid;
    (b) preparing a drill string having at least one stabilizer and a lower end;
    (c) drilling the borehole with the drill string and circulating the drilling fluid in the borehole while drilling;
    (d) monitoring torque during drilling with the drill string; and
    (e) when a selected torque is reached, circulating a Drill and Seal Treatment (DST) pill over the formation while moving the stabilizer in the borehole, said DST pill having an API fluid loss of drilling fluid of less than 6 ml/30 min.

8. The method of claim 7 further comprising the steps of:
    (f) moving the lower end of the drill string to above the formation and circulating the drilling fluid for a selected time;
    (g) moving the lower end of the drill string below the formation;
    (h) monitoring a second torque; and
    (i) continuing drilling or repeat steps (d) through (h), depending on the second torque.

9. The method of claim 7 wherein the pill comprises at least 10 pounds per barrel of blocking solids.

10. The method of claim 9 wherein the blocking solids are selected based on estimated pore throat sizes of the formation.

* * * * *